US010733957B2

(12) United States Patent
Marcu

(10) Patent No.: US 10,733,957 B2
(45) Date of Patent: Aug. 4, 2020

(54) METHOD AND SYSTEM FOR DISPLAY COLOR CALIBRATION

(71) Applicant: Apple Inc., Cupertino, CA (US)

(72) Inventor: Gabriel Marcu, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/143,043

(22) Filed: Sep. 26, 2018

(65) Prior Publication Data

US 2020/0098333 A1    Mar. 26, 2020

(51) Int. Cl.
| | | |
|---|---|---|
| G09G 5/06 | (2006.01) | |
| G09G 5/04 | (2006.01) | |
| G06T 7/90 | (2017.01) | |
| G09G 5/10 | (2006.01) | |
| G06T 7/00 | (2017.01) | |

(52) U.S. Cl.
CPC ............ *G09G 5/04* (2013.01); *G06T 7/90* (2017.01); *G09G 5/06* (2013.01); *G09G 5/10* (2013.01); *G06T 7/0004* (2013.01); *G06T 2207/30121* (2013.01); *G09G 2320/0666* (2013.01); *G09G 2320/0693* (2013.01)

(58) Field of Classification Search
CPC .... G09G 5/02; G09G 5/06; G09G 2320/0696; G09G 2320/0666; G06T 7/90; G06T 11/001; H04N 1/60
See application file for complete search history.

(56) References Cited

U.S. PATENT DOCUMENTS

| | | | |
|---|---|---|---|
| 6,781,596 B2 | 8/2004 | Falk | |
| 7,190,487 B2 | 3/2007 | Dalrymple | |
| 7,777,760 B2 | 8/2010 | Marcu | |
| 7,983,479 B2* | 7/2011 | Suzuki | ............... H04N 1/6058 345/601 |
| 8,654,142 B2 | 2/2014 | Beeman | |
| 2002/0122207 A1* | 9/2002 | Klassen | ............... H04N 1/6019 358/2.1 |
| 2007/0086027 A1* | 4/2007 | Tin | ........................ G09G 5/02 358/1.9 |
| 2011/0305389 A1* | 12/2011 | Maltz | ................... G06T 11/001 382/167 |
| 2018/0276787 A1* | 9/2018 | Chen | ................... G06F 12/0207 |

* cited by examiner

*Primary Examiner* — Antonio A Caschera
(74) *Attorney, Agent, or Firm* — Blank Rome LLP

(57) ABSTRACT

First color response values of vertices of a first unit cube defined within a cubic color output space of the display device are measured. For each of first intermediate values determined based on the measured first color response values, RGB adjustment values are calculated by tetrahedral decomposition and interpolation so that each calculated RGB adjustment value is within a boundary defined by the first unit cube. When boundary defined by the first unit cube is reached, a second unit cube is defined within the cubic color output space, wherein a first vertex of a plurality of vertices of the second unit cube corresponds to the calculated RGB adjustment values of a previous intermediate value that is one of the first intermediate values. Second color response values corresponding to the plurality of vertices of the second unit cube except the first vertex are measured.

20 Claims, 7 Drawing Sheets

METHOD AND SYSTEM FOR DISPLAY COLOR CALIBRATION

BACKGROUND

This disclosure relates generally to a method and system for color calibration of a display. More particularly, but not by way of limitation, this disclosure relates to a dynamic and adaptive display color calibration method and system in which points to be measured next in a color output space are determined based on actually measured color response values, so that the unique characteristics of the display can be accurately tracked during the color calibration.

Modern consumer electronic devices incorporate display devices (e.g., liquid crystal display (LCD), organic light emitting diode (OLED), plasma, digital light processing (DLP), and the like) to exchange information with users. Operation characteristics of the display devices may vary from device to device due to inherent properties of the display devices. For example, variations may exist in LCD components, such as backlight variations due to light emitting diode (LED) wavelength and phosphor concentration, color filter thickness, and the like. Thus, each display device may have slightly different color characteristics, white point, and the like.

A white point of a display device may be defined by a pair of chromaticity values (x,y) that represent a color produced by the device when the device generates all colors at full power (without any correction or calibration applied). For example, when red, green, and blue channels for a display device are all active at full power (e.g., maximum voltage applied from display driver to each of the red, green, and blue sub-pixels of the display), the chromaticity values, as measured in Cartesian coordinates x and y with respect to a chromaticity diagram, are the white point of the display device. White points may vary among display devices due to inherent properties such that when the red, green, and blue channels for a display device are all active at full power, the resulting (x, y) chromaticity value corresponding to the white point is different from the (x, y) chromaticity value corresponding to the white point of another display device when the red, green, and blue channels for the other display device are also all active at full power.

This native or original (uncorrected) white point of the display device may be corrected in a white point calibration process to be adjusted to a target white point which is consistent across multiple display devices. For example, the target white point may correspond to the D65 illuminant of the International Commission on Illumination (CIE). In the white point calibration, each device may be tuned (e.g., in a factory, or post-shipping during a calibration process) to the target white point by adjusting display control settings such as gain values for the red, green, and blue channels individually. Alternately, RGB adjustment values that produce the color (e.g., represented in a device-independent color space with target chromaticity coordinates ($x_0$, $y_0$) and target luminance $Y_0$) corresponding to the target white point may be stored in a look up table (LUT).

In addition to white point calibration, the display device may be also subject to gray tracking calibration to faithfully reproduce the full range of gray levels from black to white (e.g., represented by the target white point) on the display device so that the shades of gray (e.g., linear range of R=G=B from 0 to 1) at different luminance levels will all appear to have the same neutral hue as the target white point (e.g., target chromaticity coordinates ($x_0$,$y_0$) for every gray level), and the highest luminance level of gray (e.g., target "white" color; target luminance $Y_0$) will correspond to the brightness of the target white point. Accuracy of the gray tracking calibration using conventional techniques may depend on "good" balance between the native (uncorrected) response curves of each color channel (e.g., R, G, or B) of the display device (e.g., low or predicted non-linearity of electro-optical transfer function of the display). However, it is desirable to maintain high accuracy of the gray tracking calibration (or calibration of "gray" levels (e.g., luminance levels) of any color of interest) even in cases where there is excessive variation in the balance between the native response curves of each color channel of the display (e.g., high or unpredictable non-linearity of electro-optical transfer function of the display).

SUMMARY

The following presents a simplified summary of the disclosed subject matter in order to provide a basic understanding of some aspects of the subject matter disclosed herein. This summary is not an exhaustive overview of the technology disclosed herein. It is not intended to identify key or critical elements of the invention or to delineate the scope of the invention. Its sole purpose is to present some concepts in a simplified form as a prelude to the more detailed description that is discussed later.

In one embodiment, a display color calibration method includes: measuring first color response values corresponding to a plurality of vertices of a first polyhedron defined within a color output space of a display device; calculating, for each of a first plurality of intermediate values determined based on the measured first color response values, red, green, and blue (RGB) adjustment values by decomposing the first polyhedron into a plurality of polyhedrons, identifying one of the plurality of polyhedrons that contains the intermediate value, and interpolating values of vertices of the identified polyhedron to calculate the RGB adjustment values for the intermediate value, wherein each calculated RGB adjustment value is within a boundary defined by the first polyhedron; defining, in response to determining that none of the plurality of polyhedrons of the first polyhedron contain a current intermediate value, a second polyhedron within the color output space, wherein a first vertex of a plurality of vertices of the second polyhedron corresponds to the calculated RGB adjustment values of a previous intermediate value that is one of the first plurality of intermediate values; measuring second color response values corresponding to the plurality of vertices of the second polyhedron except the first vertex; and storing the RGB adjustment values within the boundary defined by the first polyhedron, and RGB adjustment values within a boundary defined by the second polyhedron into one or more look up tables.

In another embodiment, the method may be embodied in computer executable program code and stored in a non-transitory storage device. In yet another embodiment, the method may be implemented on a system.

BRIEF DESCRIPTION OF THE DRAWINGS

While certain embodiments will be described in connection with the illustrative embodiments shown herein, the invention is not limited to those embodiments. On the contrary, all alternatives, modifications, and equivalents are included within the spirit and scope of the invention as defined by the claims. In the drawings, which are not to scale, the same reference numerals are used throughout the description and in the drawing figures for components and elements having the same structure, and primed reference numerals are used for components and elements having a similar function and construction to those components and elements having the same unprimed reference numerals.

DESCRIPTION

Figure 1:
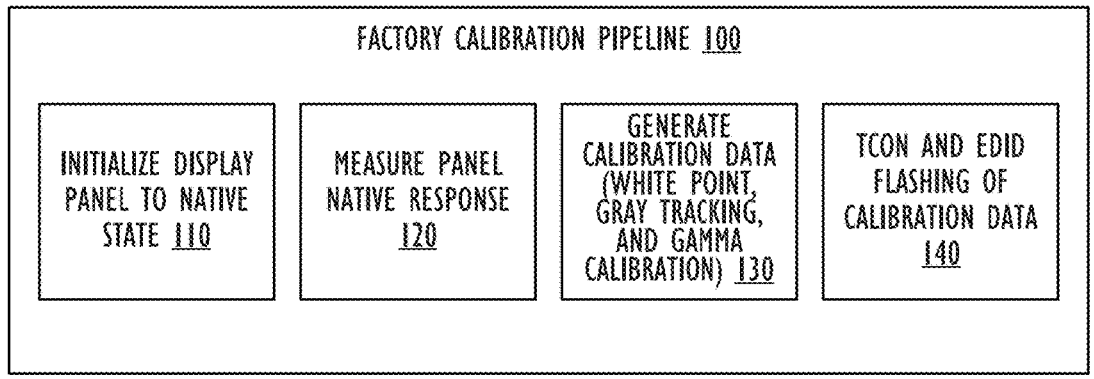
FIG. 1 illustrates, a typical factory calibration pipeline for calibration of a display device.

In the following description, for purposes of explanation, numerous specific details are set forth in order to provide a thorough understanding of the inventive concept. As part of this description, some of this disclosure's drawings represent structures and devices in block diagram form in order to avoid obscuring the invention. In the interest of clarity, not all features of an actual implementation are described. Moreover, the language used in this disclosure has been principally selected for readability and instructional purposes, and may not have been selected to delineate or circumscribe the inventive subject matter, resort to the claims being necessary to determine such inventive subject matter. Reference in this disclosure to "one embodiment" or to "an embodiment" or "another embodiment" means that a particular feature, structure, or characteristic described in connection with the embodiment is included in at least one embodiment of the invention, and multiple references to "one embodiment" or "an embodiment" or "another embodiment" should not be understood as necessarily all referring to the same embodiment.

It will be appreciated that in the development of any actual implementation (as in any development project), numerous decisions must be made to achieve the developers' specific goals (e.g., compliance with system- and business-related constraints), and that these goals may vary from one implementation to another. It will also be appreciated that such development efforts might be complex and time-consuming, but would nevertheless be a routine undertaking for those of ordinary skill in the design and implementation of signal processing having the benefit of this disclosure.

The terms "a," "an," and "the" are not intended to refer to a singular entity unless explicitly so defined, but include the general class of which a specific example may be used for illustration. The use of the terms "a" or "an" may therefore mean any number that is at least one, including "one," "one or more," "at least one," and "one or more than one." The term "or" means any of the alternatives and any combination of the alternatives, including all of the alternatives, unless the alternatives are explicitly indicated as mutually exclusive. The phrase "at least one of" when combined with a list of items, means a single item from the list or any combination of items in the list. The phrase does not require all of the listed items unless explicitly so defined.

This disclosure pertains to a method and system for color calibration of a display. In a factory during manufacture (or post-shipping during a self-calibration process using a specialized measurement instrument), a display device may be subject to color calibration to accurately track "gray" levels (e.g., luminance levels) relative to a selected point in a color output space (e.g., cubic color output space) of a display representing a native color gamut of the display device. The selected point may be a native or target white point of the display device. Alternately, the selected point may be a target color point having a predetermined luminance (Y) and chromaticity (x, y) value in the color output space. As used herein, display "color calibration" may refer to gray tracking calibration to accurately track luminance levels of any selected point of a color of interest (including, but not limited to, the white point) from black to the selected point having luminance (Y) and chromaticity (x, y). Output of the display color calibration may be one or more look up tables (LUTs) with RGB adjustment values to faithfully reproduce the range of luminance levels from black to the selected point. In one embodiment, the RGB adjustment values for each row in the LUT may have the same chromaticity as that of the selected point and sequentially lowered luminance values based on a desired target gamma of the display device. In this case, gamma correction and color correction (e.g., gray tracking correction) may be computed in the same process and encapsulated in the same 3×N LUT where 3 corresponds to the number of color channels (e.g., red, green, and blue channels) and N corresponds to the number of entries (e.g., luminance levels, gray levels, or rows) in the LUT.

In one embodiment, for the selected point (e.g., native or target white point, or another target color point), the color calibration system may perform the color calibration so that the entire color calibration is aligned relative to the selected point. RGB adjustment values for storage in the LUT for the selected point may be determined based on known calibration techniques such as white point calibration. If the selected point is the target white point of the display device, then, in the white point calibration, a target device-independent color space value (e.g., target value in CIEXYZ color space, CIELAB color space, and the like) corresponding to the target white point may be utilized to calculate the corresponding RGB adjustment values. For example, if the selected point is the target white point, and if the target white is set at the maximum brightness of the display device, then at least one of the RGB adjustment values derived in the white point calibration may be set in the LUT at the maximum digital count or code (e.g., value is 256 for at least one of R, G, and B, when the range of possible values is 0-256). In this case, the target white will be on one of the side faces of the color output space of the display device.

In one embodiment, the color calibration system may define a polyhedron (e.g., cube, cuboid, and the like) in the color output space of the display device so that one vertex of the polyhedron is positioned at the RGB adjustment value corresponding to the (calibrated) selected point (e.g., target white point) of the display device relative to which the entire color calibration is aligned. For each vertex (except the one vertex corresponding to the selected point for which the RGB adjustment values are already known) of the polyhedron defined in the color output space, the color calibration system may display on the display, a color patch corresponding to (uncorrected) RGB values of the vertex, and measure corresponding color response values using a measuring instrument. The color response values may be represented in a device-independent color space like CIELAB color space, CIEXYZ color space, CIExyY color space, and the like.

The color calibration system may then determine one or more intermediate values in the device-independent color space based on the target device-independent color space value of the selected point. In one embodiment, each intermediate value may have the same chromaticity value as the selected point. A luminance value of each intermediate value may be successively lowered, one step at a time, from the target luminance of the selected point by a predetermined fraction. In one embodiment, for each intermediate value, the color calibration system may perform tetrahedral decomposition and interpolation based on the measured color response values of the vertices of the defined polyhedron and based on the calibration data of the selected point (which is one vertex of the defined polyhedron). In the tetrahedral decomposition, the color calibration system may decompose the polyhedron into a plurality of tetrahedrons (e.g., six tetrahedrons), and identify one of the plurality of tetrahedrons that contains a target point corresponding to the intermediate value. The color calibration system may then perform interpolation based on weights assigned to vertices of the identified tetrahedron to calculate RGB adjustment values for the target point corresponding to the intermediate value.

The color calibration system may repeat the above process for each successive intermediate value of lower luminance until it is determined during the tetrahedral decomposition and interpolation process that the current intermediate value does not belong to any of the plurality of tetrahedrons of the polyhedron. For example, the color calibration system may determine that the current intermediate value does not belong to any of the plurality of tetrahedrons when none of the plurality of tetrahedrons has weights for each corresponding vertex between a range of zero and one for a target point corresponding to the current intermediate value. When the color calibration system determines that the current intermediate value does not belong to any of the plurality of tetrahedrons, the calibration system may define a new polyhedron in the color output space based on RGB adjustment values of a previous intermediate value that was successfully identified to be within one of the plurality of tetrahedrons of the (previous) defined polyhedron. That is, the color calibration system may dynamically define the new polyhedron so that one vertex of the new polyhedron is positioned at the RGB adjustment values corresponding to the (calibrated) previous intermediate value. The color calibration system may also dynamically adjust the size of the new polyhedron so that an interval (between RGB values) of measuring color response values may be changed depending on the level of accuracy of calibration that is desired and depending on the characteristics of the panel (as gleaned from the color calibration performed thus far). For example, when the calculated RGB adjustment values indicate a severe color imbalance between response curves of red, green, and blue channels (e.g., higher non-linearity of electro-optical transfer function), the color calibration system may set smaller polyhedrons (e.g., smaller cubes) so that accuracy of the calibration can be increased.

Next, for each vertex (except the one vertex corresponding to the previous intermediate value) of the new polyhedron defined in the color output space, the color calibration system may again display on the display, a color patch corresponding to (uncorrected) RGB values of the vertex and measure a corresponding color response value using the measuring instrument. The color calibration system may then determine intermediate values corresponding to the new polyhedron, and iteratively perform the tetrahedral decomposition and interpolation process described above with respect to target points corresponding to the intermediate values, and thereby, calculate RGB adjustment values for each "gray" level of the selected point. The color calibration system may define additional polyhedrons until the intermediate value reaches the lowest luminance level (e.g., value of 0 or "black"). The calibration system may store the RGB adjustment values in LUTs for the selected point relative to which the color calibration is aligned. The color calibration system may also perform multiple similar color calibrations for multiple selected points in the color output space, to thereby generate multiple color correction curves (e.g., multiple gray tracking correction curves for multiple different white points, skin-tone tracking correction curve for skin tones, red tracking correction curve for correcting for the color red, and the like). During operation, the display may then use one of the LUTs or interpolate between multiple LUTs depending on the current selected point.

The color calibration performed by the color calibration system is thus interactive and unlike conventional color calibration systems, does not assume any electro-optical response of the panel. Further, since the measurement of color response values, adjustment of polyhedron (e.g., cube or cuboid) size, and calculation of RGB adjustment values is performed for each polyhedron dynamically and adaptively based on calibration data of the previous polyhedron, the color calibration is adaptive to the display characteristics of the display and is iteratively self-driven in selecting the next measurements based on the electro-optical response of the panel and the part of calibration that has already been performed. This ensures that the color calibration method always finds the best path to discover the next optimum measurements for best calibration results. Still further, since accuracy of the color calibration method can be dynamically customized even during the color calibration process is ongoing, even the most unexpected panel electro-optical response that may exist can be accounted for (e.g., by setting small polyhedron size, thereby increasing the number of measurements). The color calibration method is thus robust, very reliable, and versatile.

Referring now to FIG. 1, a typical factory calibration pipeline 100 for color calibration of a display device is illustrated. Typical factory calibration pipeline 100 may be implemented in a factory during manufacture of the display device for achieving the best color performance of the display device and ensure correctness of a color model (e.g., RGB, CMYK, CIEXYZ, CIELAB, and the like) used in color management by the display device. Color management may refer to controlled conversions between color models or color spaces of various devices so as to obtain a good color match across the color devices. This produces consistent color rendering across all display devices contributing to high color quality and faithful reproduction of colors as per a source content author's rendering intent.

As shown in FIG. 1, factory calibration pipeline 100 may include initializing the display panel to a native (uncorrected) state (block 110). That is, the display panel to be calibrated may be set in a native mode where no color corrections are applied to various color channels (e.g., RGB) of the display. At block 120, the calibration system implementing factory calibration pipeline 100 may measure a native response of the display panel. That is, the calibration system may measure chromaticity of RGB primaries of the display together with other parameters. Based on the native panel response measurement at block 120, the calibration system implementing pipeline 100 may perform various calibrations including white point, gray tracking and gamma calibrations to generate calibration data 130. This calibration data may be in a form of tables or numeric values. Calibration data 130 together with the RGB primary measurements may then be flashed into the timing controller (TCON) and extended display identification data (EDID) or DisplayID of the display panel at block 140. The calibration data flashed into the display panel at block 140 may constitute the calibration information of the display device.

When the display device may then be connected to a computer system, an operating system (OS) may detect the EDID (or DisplayID) of the display and automatically build an International Color Consortium (ICC) profile. The ICC profile may be used by an integrated Color Management System of the OS to accurately transform any RGB system color into an RGB display color within the display color gamut that is displayable on the display device.

Accuracy of the color transformation performed by the display device is entirely dependent on the color calibration performed in factory calibration pipeline 100, the accuracy of the data in the ICC profile of the display device, and on the correct correspondence of the color model of the profile with the physical behavior of the calibrated display. Ideally, the color calibration performed in the factory calibration pipeline 100 should ensure that there is an accurate correspondence between the physical behavior of the calibrated display panel and the ICC profile of the panel that models this behavior. If there is an error in the color calibration performed in the factory calibration pipeline 100, that will translate in an inaccurate color rendition on the display panel. Errors during the typical color calibration performed using factory calibration pipeline 100 may stem from various assumptions that may be made during measurement at block 120 and generation of calibration data at block 130.

For example, factory calibration pipeline 100 may assume that an electro-optical response of the display panel can be approximated with a power law function of an exponent that is estimated from a few measurements. In case this estimation is wrong or if the panel response is not following this power law function, color calibration performed in the factory calibration pipeline 100 may be inaccurate, thereby translating into inaccurate ICC profile data, and an inaccurate color rendition on the display panel.

Factory calibration pipeline 100 may also assume that the display device has a certain gamma (e.g., gamma of about 2.2), and certain assumed RGB primaries. With these assumptions, when generating calibration data by performing gray tracking calibration, the calibration system implementing factory calibration pipeline 100 may use a matrix model to iteratively calculate RGB adjustment values for each of a predetermined number of probable gray tracking points, and use interpolation techniques to generate the full gray tracking correction curve from black to a target white based on the calculations. That is, based on the assumption of a certain gamma, certain RGB primaries, and the matrix model, the calibration system implementing pipeline 100 may estimate RGB adjustment values for a target gray level corresponding to a given input gray tracking point. The calibration system may then measure color response values from the panel when the panel is driven based on the estimated RGB adjustment values. The calibration system may then evaluate a difference between the measured color response value and the target gray level, and adjust the estimated RGB adjustment values based on the evaluation.

For example, by performing the evaluation, the calibration system may calculate how much each of the red, green and blue values must be modified before doing the next measurement of color response values based on the adjusted RGB adjustment values. Calibration system may apply several iterations of this modification of RGB adjustment values for the given input gray tracking point up until accurate RGB adjustment values with which the difference between the measured color response value and the target gray level is minimized. Calibration system may repeat this method for additional target gray levels corresponding to additional points on the gray tracking curve. Calibration system may then generate the full gray tracking curve for all gray levels from black to the target white by interpolating between the RGB adjustment values calculated for the multiple target gray levels. Further, since the calibration system implementing factory calibration pipeline 100 is interpolating based on RGB adjustment values calculated for the multiple target gray levels, another assumption required by factory calibration pipeline 100 is that the gray tracking calibration can be accurately performed by interpolating between (relatively few) RGB adjustment values calculated for the multiple target gray levels. That is, factory calibration pipeline 100 assumes that the non-linearity of the electro-optical transfer function of the display device is not higher than a threshold, so that interpolated RGB adjustment values will accurately represent corresponding target colors. However, since the calibration system implementing factory calibration pipeline 100 is operating based on numerous assumptions, the calibration method may fail if the underlying assumptions turn out to be incorrect or inaccurate.

Figure 2:
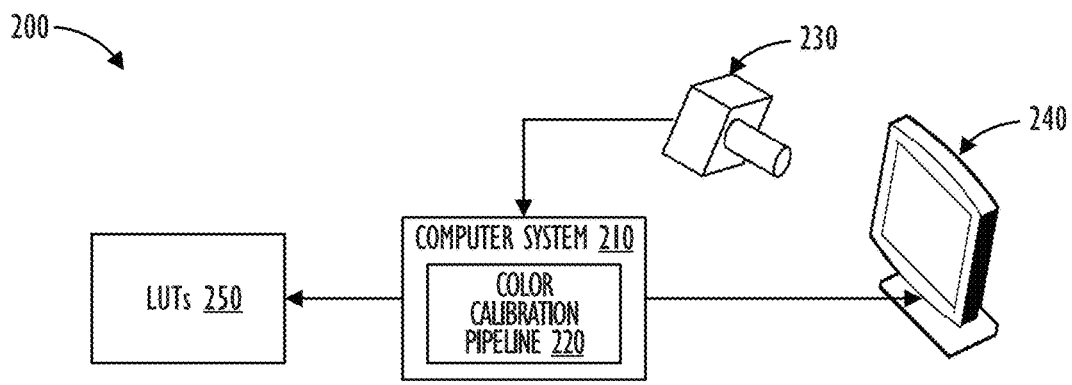
FIG. 2 shows, in block diagram form, a color calibration system for calibrating a display, in accordance with one or more embodiments.

Referring now to FIG. 2, improved color calibration system 200 for performing color calibration in accordance with one or more embodiments is illustrated. Color calibration system 200 may include display 240 (e.g., display device, display panel, and the like). Display 240 may be a standard gamut or wide gamut display and may be used to display text and graphic output as well as receiving user input via a user interface. The design and implementation of display 240 may differ depending on the type of the display device. Non-limiting examples of display device types include liquid crystal displays, plasma displays, quantum dot-based displays, and light emitting diode displays (e.g., organic light emitting diode displays), digital light processing, and the like. Display 240 may be a standalone display device like a computer monitor, television screen, and the like, or may be a display panel incorporated into an electronic device like a digital camera, a personal digital assistant (PDA), personal music player, mobile telephone, server, notebook, laptop, desktop, or tablet computer. In one embodiment, display 240 is an RGB display with color channels (sub-pixels) for red, green, and blue.

Color calibration system 200 may be implemented as part of an assembly line in a factory during manufacture of display 240 for performing color calibration of display 240 before shipping to a customer. Alternately, color calibration system 200 may also be implemented as an external calibration system that can be utilized on-demand by customers to self-calibrate display 240 by connecting color calibration system 200 to a system of display 240. Calibration system 200 may further include measurement unit 230 (e.g., measurement instrument) that is connected to and controlled by computer system 210. Computer system 210 may include standard computer components like central processing unit (CPU), read-only memory (ROM), random access memory (RAM), storage device (e.g., hard disk), input/output devices (e.g., keyboard, mouse, monitor) and the like. Color calibration pipeline 220 for performing color calibration may be implemented on computer system 210. Color calibration performed by color calibration pipeline 220 are described in detail below in connection with FIGS. 3-7. In addition to color calibration implemented via color calibration pipeline 220, color calibration system 200 may also perform other types of calibration of, e.g., gamma, white point, black point, and the like, of display 240.

Computer system 210 may further control operation of display 240, output test and calibration image or video color calibration signals (e.g., color patches) to display 240 and then query the measurement unit 230 to determine what is actually displayed by display 240 in response to the output color calibration signals (e.g., measured color response values). The actually measured color response display values are uncorrected output data for display 240 and are identified by computer system 210 as color response values of display 240. In one embodiment, the color response values detected by measurement unit 230 may be in a device-independent color space like CIEXYZ color space, CIE xyY color space, the CIE LAB color space, and the like.

Based on the color response values measured by measurement unit 230, color calibration pipeline 220 implemented by computer system 210 may perform color calibration to generate one or more look up tables (LUTs) 250 for later use by display 240 during normal operation. As will be further explained below, LUTs 250 may include RGB adjustment values output from color calibration pipeline 220. The RGB adjustment values may be used for color correction so that a standard color or image signal that is supplied to display 240 will be rendered more faithfully by accounting for the unique characteristics of display 240. For example, in certain ranges, display 240 might, due to its own particular characteristics, render certain colors somewhat off-color. The adjustment values in LUTs 250 may provide for color correction so that the output colors displayed by display 240 more closely match the corresponding input color signals (i.e., the rendering intent). Therefore, as used herein and understood by those of ordinary skill in the art, the term "corrected colors" for display 240 is defined to mean output (displayed) colors with values that have been corrected in response to the measured color response values (e.g., as provided by measurement unit 230 and used for color calibration by color calibration pipeline 220). In other words, the measured color response values are converted to RGB adjustment values that are then sent to and/or utilized by display 240 to produce and display the corrected colors. Input values for display 240 are thereby mapped into an output space that represents all the corrected color values. The information for making the color corrections is stored in and provided by LUTs 250.

Figure 3:
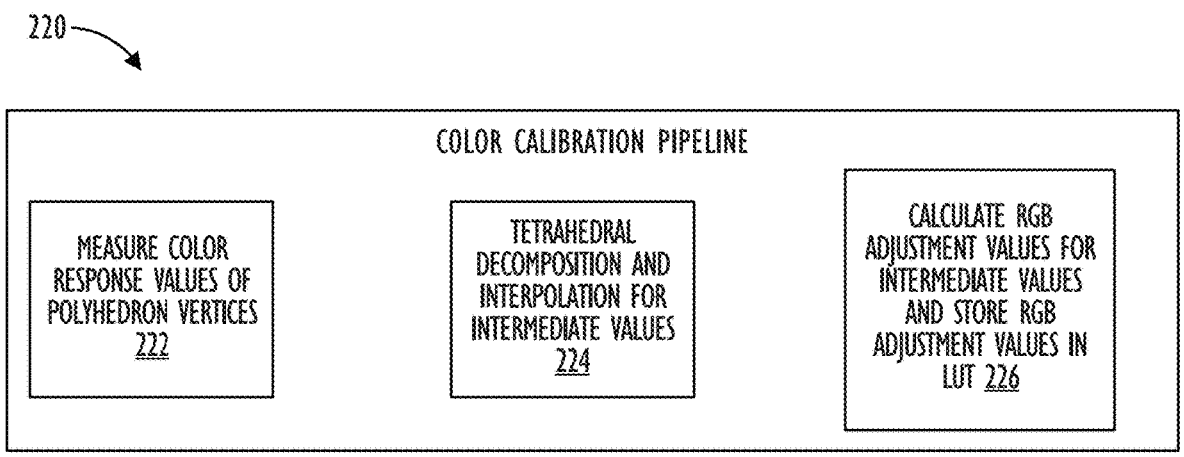
FIG. 3 is a flow diagram of a color calibration pipeline implemented using the color calibration system shown in FIG. 2, in accordance with one or more embodiments.

Referring now to FIG. 3, a flow diagram of color calibration pipeline 220, implemented using computer system 210 shown in FIG. 2, in accordance with one or more embodiments, is illustrated. In block 222, color response values are measured. These values may be conveniently represented in well-known formats (e.g., device-independent formats). In one embodiment, color response values may be measured in CIEXYZ format so that $(X,Y,Z)_i$ may be output by measurement unit 230 for each set of red, green, and blue signal values $(R,G,B)_i$. In one embodiment, these measurements are made at vertices of polyhedrons (e.g., cubes or cuboids) defined in a color output space of display 240, as described further in detail below in connection with FIGS. 6-7.

Following block 222, tetrahedral decomposition and interpolation is performed for intermediate values in block 224 based on the measured color response values of polyhedra vertices. In one embodiment, the intermediate values may represent "gray" levels for the selected point in the device-independent color space. For example, the intermediate values may have the same (x, y) chromaticity value as the selected point, while having successively lower luminance values (lowered by a predetermined fraction) compared to the luminance value of the selected point. Then, in block 226, RGB adjustment values may be calculated for the intermediate values based on the tetrahedral decomposition and interpolation, and the calculated RGB adjustment values may be stored in LUTs 250 (FIG. 2).

Figure 4:
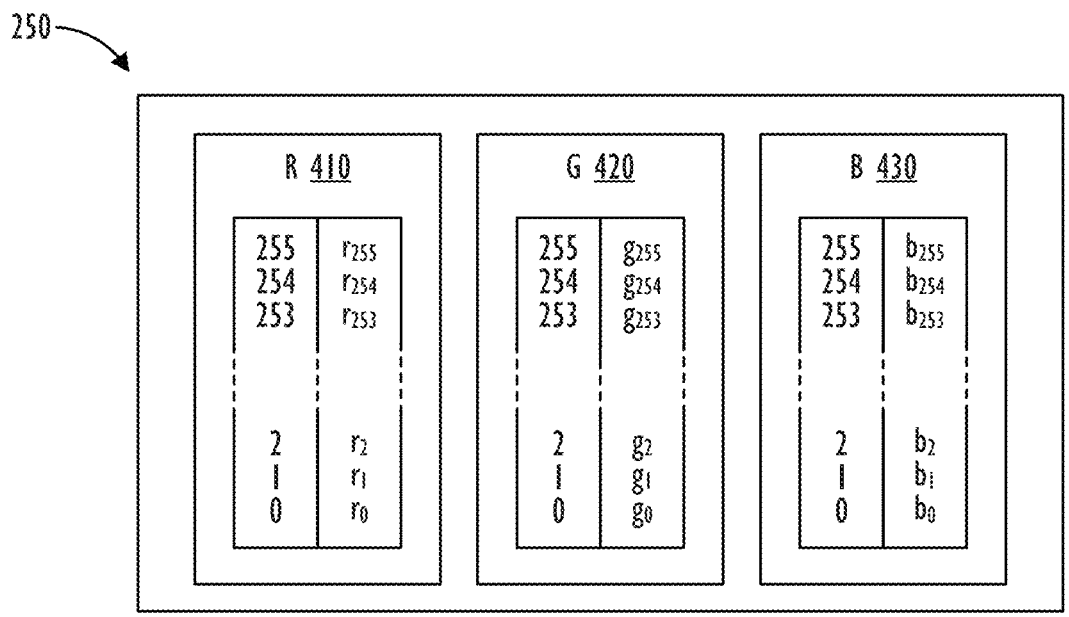
FIG. 4 is a depiction of a look up table (LUT) of FIG. 2, in accordance with one or more embodiments.

Referring now to FIG. 4, LUT 250 of FIG. 2 in accordance with one or more embodiments, is illustrated. Each LUT 250 may include LUT 410 for red values between 0 and 255, LUT 420 for green values between 0 and 255, and LUT 430 for blue values between 0 and 255. The LUTs 410, 420, and 430 may be independent of each other and provide respective adjustment values for red, green, and blue independently for each red, green, and blue color. Alternately, LUT 250 may be a two-dimensional or three-dimensional LUT with multiple output values for each input value.

Figure 5:
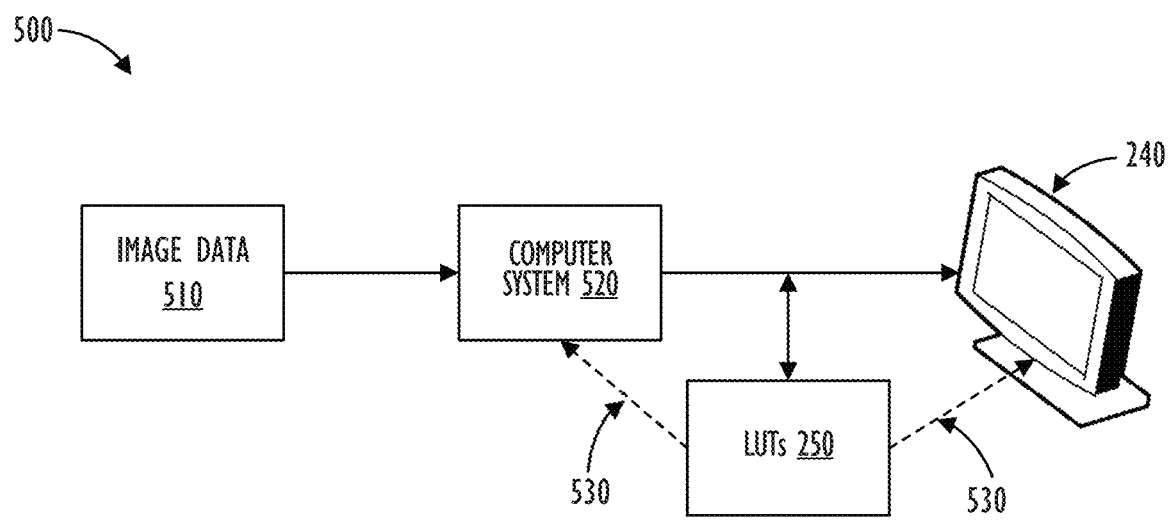
FIG. 5 is a block diagram depicting the operation of a calibrated display system utilizing the look up table of FIG. 4, in accordance with one or more embodiments.

Referring now to FIG. 5, a block diagram depicting the operation of a calibrated display system 500 utilizing LUTs 250 (FIGS. 2 and 4) in accordance with one or more embodiments, is illustrated. (Uncorrected) image data 510 may be provided to an image control unit, such as computer system 520 (including, e.g., CPU, ROM, RAM, hard disk, input-output devices, and the like), which in turn may provide a corrected image or video signal to display 240, as will be readily understood by those of ordinary skill in the art. The data utilized by computer system 520 to correct image data 510 may be provided by LUTs 250. Dotted arrows 530 between LUTs 250, computer system 520, and display 240, depict that LUTs 250 may be located in an on-board memory of display 240, in a storage device of computer system 520, and/or externally from either computer system 520 or display 240, as may be desired and appropriate for the particular configuration at hand.

Figure 6:
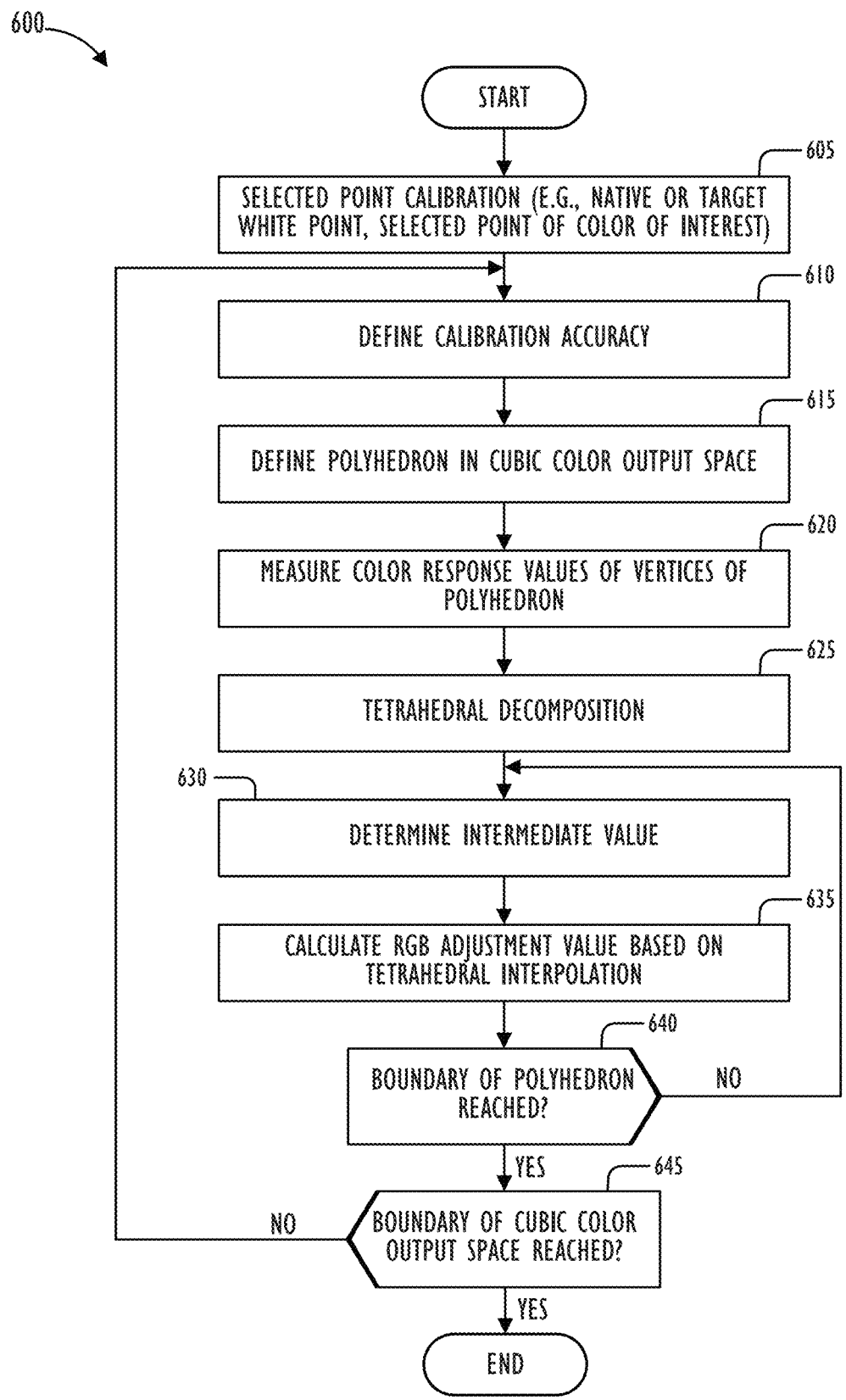
FIG. 6 shows, in flowchart form, a process for performing display color calibration, in accordance with one or more embodiments.

Referring now to FIG. 6, flowchart 600 of a process for performing display color calibration in accordance with one or more embodiments is described. As shown in FIG. 6, flowchart 600 begins at block 605 with color calibration system 200 performing calibration with respect to a selected point (e.g., target white point, selected point of a color of interest, and the like). For example, color calibration system 200 may perform white point calibration to set display 240 to a desired target white point (e.g., Illuminant D65) in a color output space (e.g., cubic color output space) corresponding to display 240. If no target white point is specified, color calibration system 200 may skip calibrating display 240 with respect to the target white point at block 605, and instead, directly perform the color calibration via color calibration pipeline 220 so the entire color calibration is aligned relative to the native white point of display 240 (e.g., uncorrected white produced by display 240 when display 240 generates all colors at full power). If at block 605, color calibration system 200 performs white point calibration, the target white point set at block 605 will be considered the white point of the calibrated panel. Alternately, color calibration system 200 may perform calibration with respect to any desired point (e.g., point selected by a user; specified in a device-independent color space as a luminance value (Y) and a chromaticity value (x,y)) of a color of interest within the color output space corresponding to display 240. Once color calibration system 200 has calibrated display 240 with respect to the selected point, color calibration system 200 may perform the color calibration via color calibration pipeline 220 so the entire color calibration is aligned relative to the selected point. The result of the selected point calibration at block 605 may be a RGB digital ratio triplet (e.g., RGB adjustment values) that for the particular display 240 will produce the selected color (e.g., selected luminance value (Y) and selected chromaticity value (x, y) in the device-independent color space). This RGB triplet may correspond to the last entry of LUT 250 (e.g., row 255 of LUT 250 of FIG. 4).

Figure 7A:
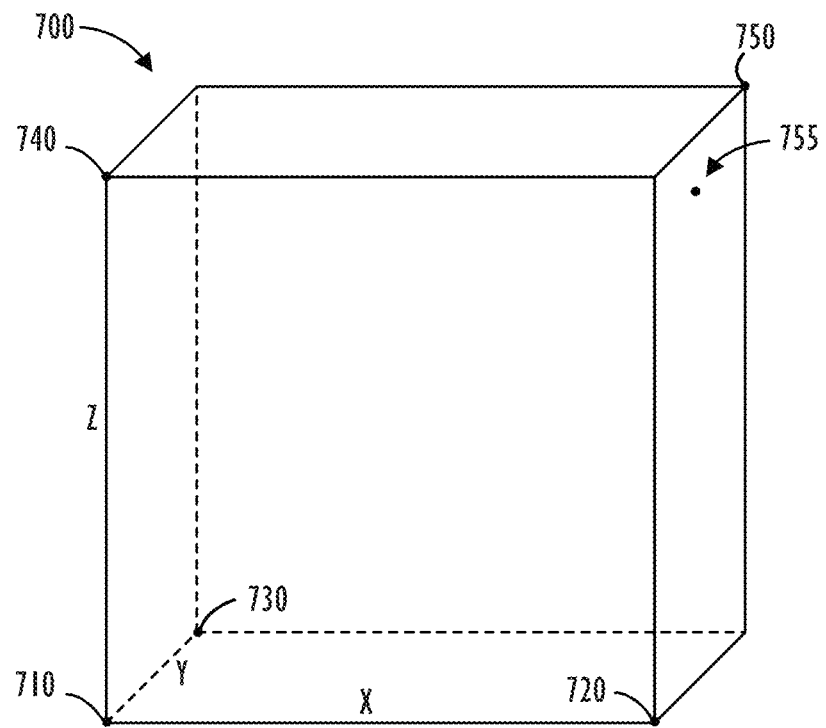
FIG. 7A is a view of a cubic color output space, in accordance with one or more embodiments.

FIG. 7A is a view of an exemplary color output space 700 of display 240, in accordance with one or more embodiments. Although in FIG. 7A (and FIGS. 7B-7D), color output space 700 is cubic, color output space 700 may not be so limited. For example, color output space 700 may also take other shapes like cuboid or other three-dimensional shapes, based on the native color gamut of display 240. In one embodiment, cubic color output space 700 may be a cube represented in an 8-bit system in each of X, Y, and Z directions, representing red (720), green (730), and blue (740), respectively. While there are thus 256 increments represented for each RGB color value, it will be understood that cubic color output space 700 may be incremented to any degree desired depending on the native display color gamut of display 240, and number of color levels desired. In FIG. 7A, all possible colors displayable by display 240 are represented within cubic color output space 700, beginning with black (710) at the origin (0,0,0) and concluding with (native) white (750) at the vertex (255,255,255) opposite the origin. Point 755 in cubic color output space 700 may represent the selected point (e.g., target white point, or point of color of interest) relative to which the entire color calibration by color calibration pipeline 220 will be aligned. For example, point 755 is a target white point. Point 755 could also be a color point of a color of interest whose "gray" levels are to be calibrated by color calibration system 200. Said another way, point 755 could be any point in cubic color output space 700 (whose corresponding device-independent color response value for this particular display 240 is known).

The human visual system is sensitive to the quality of the color gray. That is, a "gray" that is slightly bluish or slightly pinkish will be readily noticed by a human observer. On the other hand, colors reproduced by the display system that are well away from gray, such as a bright green, a dark red, a medium yellow, and so forth, can have fairly significant errors from the original color and still be acceptable to, and in many cases unnoticed by, the human observer as long as the gray (neutral colors) are correctly reproduced. Because of this sensitivity to gray, aligning the entire color calibration by color calibration system 200 relative to selected point 755 which is at the target white point may result in an overall perception of high calibration accuracy, even if calibration for other colors (e.g., red, yellow, and the like) is low.

To accurately provide color correction for display 240, color calibration system 200 may need to perform color calibration for every point within cubic color output space 700 (e.g., measure color response values for every point in cubic color output space 700 and store corresponding RGB adjustment values). However, that would be a daunting task, requiring approximately 256×256×256 measurements and corresponding 256×256×256 adjustment value sets in an 8-bit system (and exponentially more in 10-bit or 12-bit systems). Each adjustment value set would have three values for the respective RGB compensation (or adjustment) values for each such point. This is a well-recognized conundrum, and there are numerous solutions that are well known to those skilled in the art. Many solutions utilize interpolation to reduce the number of measurements required, whereby a reduced set of measurements is made within cubic color output space 700 of display 240. When omitted values are then needed, they are interpolated from the actually measured data values or points. Various known interpolation methods include linear interpolation, bi-linear interpolation, tri-linear interpolation, geometric interpolation, prism interpolation, pyramid interpolation, tetrahedral interpolation, and barycentric interpolation.

In one embodiment, selection of points in cubic color output space 700 to be included in the reduced set for measurement is optimized by color calibration system 200 for selected point 755 relative to which the color calibration is aligned. Thus, for example, when the color calibration is aligned relative to a first selected point 755, color calibration system 200 may dynamically and adaptively select a first set of points in cubic color output space 700 whose color response values are to be measured (and corresponding RGB adjustment values stored in LUT 250). Similarly, when the color calibration is aligned relative to a second selected point 755, color calibration system 200 may dynamically and adaptively select a second (different) set of points in cubic color output space 700 whose color response values are to be measured (and corresponding RGB adjustment values stored in (a different) LUT 250).

In one embodiment, color calibration system 200 selects the reduced set of points (e.g., less than total set of points in space 700) for measurement of actual color response values by dynamically and adaptively defining a plurality of polyhedrons (e.g., cubes, cuboids, and the like) in cubic color output space 700 that follow the actual or true gray ramp in cubic color output space 700 corresponding to "gray" levels of the selected point 755. Color calibration system 200 may then only measure actual color response values of vertices of the plurality of polyhedrons defined in cubic color output space 700 to accurately perform color calibration relative to selected point 755 (e.g., target white point).

In order to maintain high calibration accuracy of the "gray" levels of selected point 755, while also keeping the number of actual measurements required low, and while also accounting for (any potential) high (unpredictable and unknown) non-linearity of the electro-optical response of display 240, color calibration system 200 may further dynamically and adaptively modify a size of each polyhedron defined in cubic color output space 700. The size of each polyhedron may be adjusted based on actual measured color response of the panel (i.e., based on part of the calibration that has already been completed) to dynamically increase or decrease the number of measurement points during the color calibration, as needed. Thus, for example, the color calibration may proceed faster with less measurements taken for a panel that has "good" balance between the native (uncorrected) response curves of each color channel. On the other hand, the calibration may proceed more slowly with more measurements being made for a panel that has high non-linearity of the transfer function of each color channel. In any event, regardless of the amount of correction that is required for each "gray" level, color calibration system 200 calculates the RGB adjustment values efficiently, without compromising accuracy, even in cases where the panel has poor balance between native response curves of each color channel (which cause diminished interpolation accuracy and require more actual measurement points to color correct).

In one embodiment, by performing color calibration relative to a plurality of different selected points 755 in cubic color output space 700, color calibration system 200 may generate a repository of calibration data that calibrated display system 500 may then utilize to calculate corrected values (e.g., via interpolation) for any RGB input value, based on the current selected point 755 (e.g., current white point, or point of another color of interest). Thus, for example, calibrated display system 500 may correctly display grays for any white point (e.g., by interpolating based on one or more tables corresponding to one or more white points closest to the current white point). As another example, calibrated display system 500 may be optimized for correctly displaying skin tones by utilizing one or more correction tables corresponding to selected points 755 of skin colors.

Returning to FIG. 6, at block 610, color calibration system 200 may dynamically and adaptively define the accuracy of color calibration of display 240 by setting a size of a polyhedron (e.g., unit cube, cuboid, and the like) defined within cubic color output space 700. In one embodiment, by setting the size of the polyhedron, color calibration system 200 may define at what interval may measurements of actual color response values be taken in cubic color output space 700. RGB adjustment values for points between the points for which actual measurements are performed may then be calculated via interpolation. The size may be set by setting a value for edge length "A" of the polyhedron. When the polyhedron is a cube, size A may represent a length of each edge of the polyhedron (e.g., see FIG. 7B). As a non-limiting example, in an 8-bit system (e.g., RGB values ranging from 0-255 in cubic color output space 700), size A may be set to a number between 8 and 16. The smaller the number for A, the more accurate the calibration will be, but more measurements will be required and more time consuming the color calibration process will be. Thus, by imposing size A of each polyhedron dynamically, color calibration system 200 can customize accuracy of the color calibration dynamically.

Figure 7B:
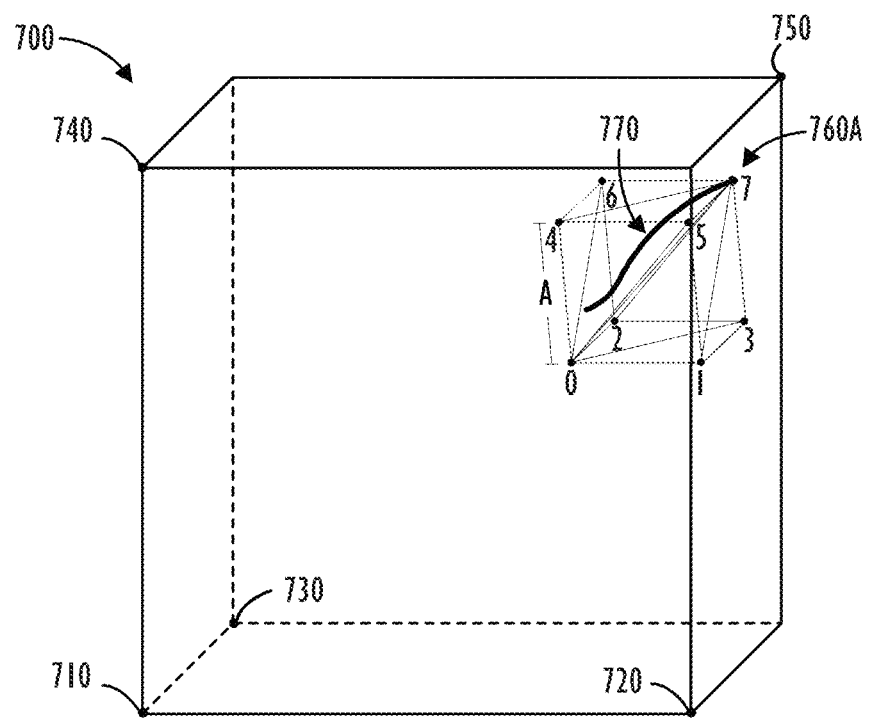
FIGS. 7B-7D are views depicting one or more polyhedrons defined in the cubic color output space of FIG. 7A for tetrahedral decomposition and interpolation, in accordance with one or more embodiments.

At block 615, color calibration system 200 defines a first polyhedron (e.g., unit cube, cuboid, and the like) in cubic color output space 700. FIG. 7B illustrates first polyhedron 760A defined as a cube in cubic color output space 700. However, polyhedron 760A could also be a cuboid or another shape. As used herein, "unit cube" 760 (e.g., 760A, 760B, and the like) can refer to any shape including cube, cuboid, and the like. Vertices 0-7 of unit cube 760A may correspond to vertices whose actual color response values may be measured by color calibration system 200. Further, color calibration system 200 may define unit cube 760A so that vertex 7 of unit cube 760A is positioned at selected point 755 that was calibrated at block 605. That is, color calibration system 200 may define first unit cube 760A so that RGB adjustment values in the last row of LUT 250 that correspond to calibrated point 755 may form vertex 7 of unit cube 760A. Based on the defined size A at block 610, color calibration system 200 may construct unit cube 760A of edge length A with one upper corner (vertex 7) in the selected point 755, and edges of length A extending in three directions to define vertices 0-6. Thus, as shown in FIG. 7B, unit cube 760A has vertex 7 located in selected point 755.

At block 620, color calibration system 200 may measure actual color response values at each of vertices 0-6 of unit cube 760A. In one embodiment, color calibration system 200 may output on display 240 (uncorrected) color patches corresponding to RGB values defined by each of vertices 0-6 of first unit cube 760A. The RGB values of each of vertices 0-6 output to display 240 may be integer values or fractional values (applied to display 240 via techniques like spatial or temporal dithering). Color calibration system 200 may then use measurement unit 230 to measure actual color response values displayed on display 240 for each of the uncorrected output color patches corresponding to vertices 0-6. The measured output color response values may be in the device-independent color space like CIEXYZ, CIELAB, CIExyY, and the like. In one embodiment, this process at block 620 may result in seven measurements (e.g., CIEXYZ, CIELAB, or CIExyY values) of actual color response values respectively corresponding to the vertices 0-6 of unit cube 760A. At block 620, actual color response values for vertex 7 may not be measured since the actual color response values (e.g., XYZ color coordinates or xyY luminance and chromaticity values) and corresponding RGB values in color output space 700 of display 240 for vertex 7 are already known based on calibration at block 605.

At block 625, color calibration system 200 may decompose first unit cube 760A into a plurality of tetrahedrons using decomposition techniques that are known to persons of ordinary skill in the art. For example, color calibration system 200 may utilize diagonal tetrahedral decomposition to decompose unit cube 760A into six tetrahedrons, each of the six tetrahedrons containing the diagonal of unit cube 760A. In another embodiment, color calibration system 200 may utilize a different decomposition technique that does not utilize the diagonal of unit cube 760A to decompose unit cube 760A into five tetrahedrons.

At block 630, based on the actual measured color response values (e.g., CIE xyY values, XYZ color coordinates, and the like) for selected point 755 (e.g., target white point) and based on a target gamma function, color calibration system 200 may successively determine or calculate intermediate values corresponding to target "gray" levels (e.g., luminance levels, gradation levels, or gray tracking points, corresponding to number of rows in LUT 250) for which RGB adjustment values are to be calculated. In one embodiment, each intermediate value may be calculated by gradually lowering the luminance value (Y) corresponding to selected point 755 by a predetermined fraction, one step at a time (while accounting for target gamma function when selected point 755 is the target white point), while keeping a chromaticity value (e.g., (x,y) chromaticity value in CIExyY color space) of each intermediate value the same as the chromaticity value of selected point 755. For example, if selected point 755 corresponds to target white point of illuminant D65 at 500 nits (i.e., highest luminance value is $Y_0$ corresponding to target white point) and the number of "gray" levels N is 1024 inputs (i.e., 0 to 1023) in LUT 250, color calibration system 200 may calculate a luminance value $Y_i$ for each intermediate value at successive lower locations of LUT 250 (after highest row for N−1=1023 corresponding to luminance $Y_0$ of target white point 755) using the following equation:

$$Y_i = Y_0 * (N_i/N-1)^\gamma, \hspace{3em} \text{Equation (1)}$$

where i is the current level (row) of LUT for which the luminance value of the intermediate value is being calculated (e.g., i=1022, 1021, and so on), and γ represents a target gamma value, and $Y_0$ is 500 nits. Further, as mentioned above, a chromaticity value (e.g., (x,y) chromaticity value in CIExyY color space) of each intermediate value may stay the same as the chromaticity value of selected point 755. By generating LUT 250 where luminance value $Y_i$ is changing for each row, while chromaticity value of selected point 755 is preserved for each row, gamma correction and color calibration may be performed in a single process and resulting RGB adjustment values stored in LUT 250 may account for both gamma calibration and color calibration. In another embodiment, calibration system 200 may change the chromaticity value of each successive intermediate value based on predetermined conditions. For example, for every row in LUT 250, a target white point may be changed to a desired value before calculation of the corresponding intermediate value and the corresponding RGB adjustment values. In Equation (1), the target luminance is illustrated to follow an exact power law function. However, any function can be selected for the target luminance that may optimize the electro optical response of the display, including, but not limited to, a function that optimizes for skin tones, memory colors, and the like. Further, for each luminance value $Y_i$, chromaticity value $(x_i, y_i)$ may be selected by a user (or by calibration system 200 based on predetermined conditions).

At block 635, for a target point, corresponding to the lower luminance value $Y_i$ and the same (or different) chromaticity value as the selected point 755, determined based on the intermediate value at block 630, color calibration system 200 may calculate RGB adjustment values based on tetrahedral interpolation. In one embodiment, using the actual color response values measured for vertices 0-6 in block 620, and the actual color response value for vertex 7 measured in block 605, color calibration system 200 may investigate which of the six tetrahedrons (derived by decomposing unit cube 760A at block 625) contain the target point. In one embodiment, each of the six tetrahedrons may be defined using four of the eight vertices (0-7) of unit cube 760A. For each of the four vertices of each of the six tetrahedrons, color calibration system 200 may calculate a corresponding weight value based on the measured color response values of the four vertices (e.g., CIE xyY values), and the value (e.g., CIE xyY value; value in the same device-independent color space as the measured color response values) of the target point being calibrated. Out of the six tetrahedrons of unit cube 760A, color calibration system 200 may thus identify one tetrahedron as containing the target point if each of the four corresponding weight values of the four vertices of the identified tetrahedron are between 0 and 1.

That is, if for any of the four vertices of each of the six tetrahedrons, when color calibration system 200 determines that the corresponding weight value of the vertex is less than 0 (i.e., negative value) or greater than 1, color calibration system 200 may identify the corresponding tetrahedron as one that does not contain the target point. Since the target point at occur at only one point in cubic color output space 700, at block 635, for each target point with successively lower luminance or "gray" level, color calibration system 200 may thus identify only one of the six tetrahedrons as containing the target point. Color calibration system 200 may then perform tetrahedral interpolation (e.g., barycentric interpolation) to calculate RGB adjustment values corresponding to the target point based on corresponding weight values of all four vertices of the identified tetrahedron and corresponding RGB values of the four vertices of the identified tetrahedron. The calculated RGB adjustment values will produce the correct color corresponding to the target point. Color calibration system 200 may store this RGB triplet in the $i^{th}$ row of LUT 250. In one embodiment, when calculating the RGB adjustment values at block 635, color calibration system 200 may round off the RGB triplet values to the nearest integer (e.g., full integer value between 0-255). In another embodiment, however, color calibration system 200 may retain higher precision and accuracy by storing in LUTs 250, fractional values of up to a certain precision corresponding to each of the RGB triplet values for producing the correct color associated with the target point. When driving display 240 with the higher precision values in LUT 250, calibrated display system 500 may use techniques like dithering (e.g., temporal or spatial dithering) to display the higher precision colors. Thus, starting from selected point 755 (and based on the target gamma function when calibrating for target white point) RGB triplet values are successively calculated for the immediate lower location of LUT 250, below the one that was calculated already, based on corresponding intermediate values.

At block 640, color calibration system 200 may determine whether a boundary of unit cube 760A has been reached. For example, when color calibration system 200 determines that the target point calculated based on the intermediate value determined at block 630 belongs to (only) one of the six tetrahedrons of unit cube 760A, color calibration system 200 at block 640 will determine that the boundary of unit cube 760A has not been reached (branch NO at block 640). Said another way, at block 640, color calibration system 200 may determine whether the RGB adjustment values calculated at block 635 have reached the boundary of unit cube 760A. For example, if none of the RGB triplet values calculated at block 635 is lower than the RGB triplet values at vertex 0 of unit cube 760A, color calibration system 200 may determine at block 640 that the boundary has not been reached (branch NO at block 640), and processing will continue at block 630 to determine the next intermediate value within unit cube 760A, and calculate the next immediate location for LUT 250 that has not been computed yet.

Figure 7C:
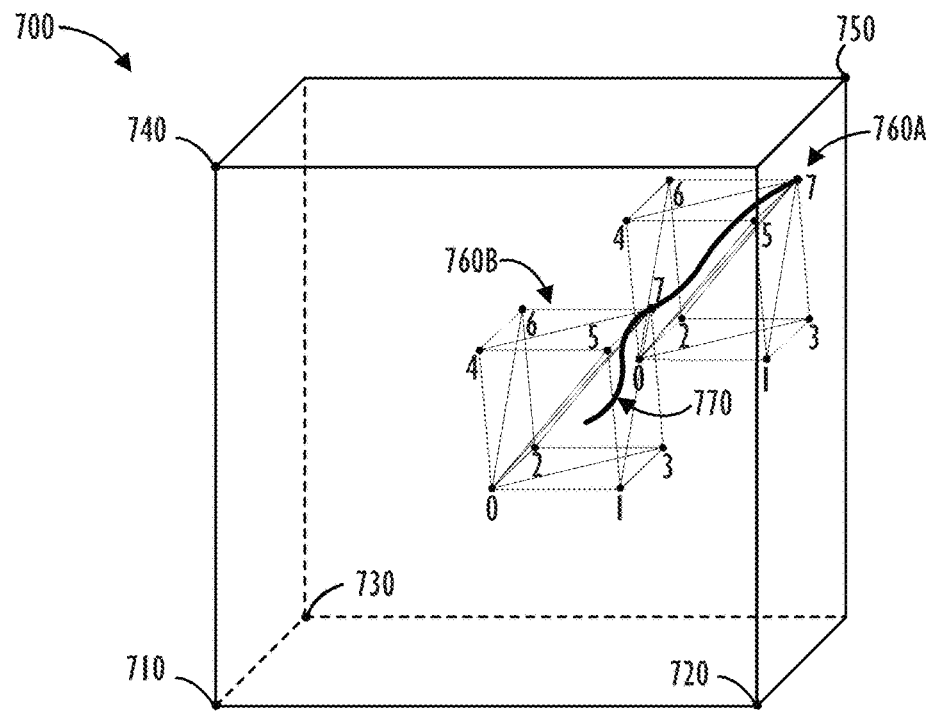
Figure 7D:
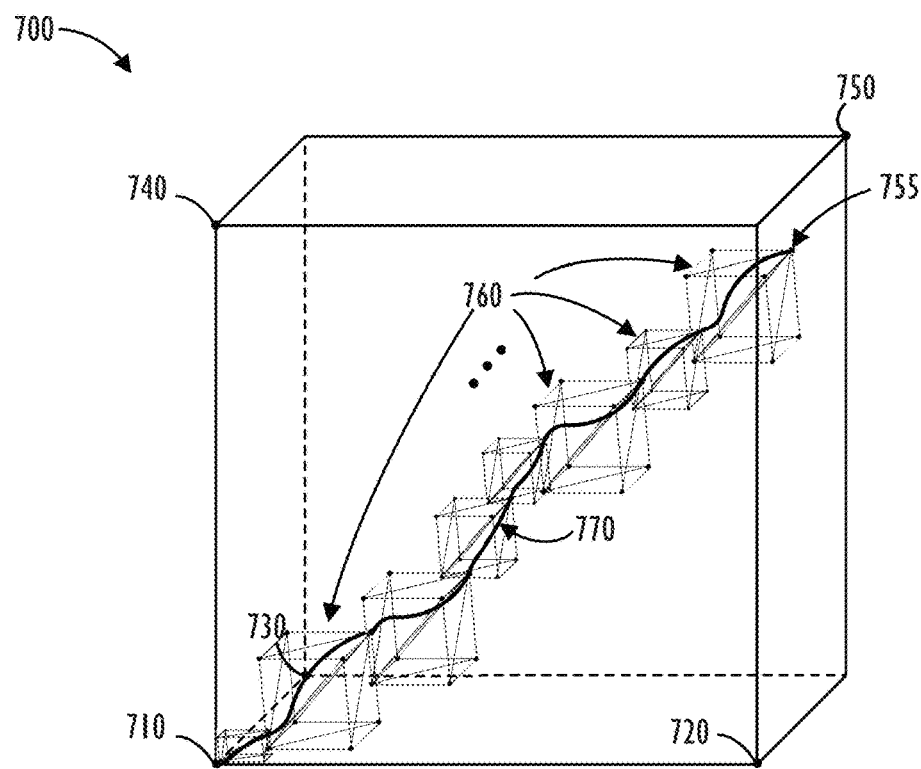

In this way, as shown in FIG. 7B, based on actual color response values at vertices 0-7 of unit cube 760A, color calibration system 200 may calculate RGB adjustment values for multiple target points corresponding to respective intermediate values with successively lower luminance values relative to luminance $Y_0$ of selected point 755. The calculated multiple RGB triplets may correspond to the actual or true "gray" levels (actual gray tracking) of selected point 755 (e.g., target white point) that produce corrected colors of successively lower gradations relative to the target color represented by selected point 755. A curve produced by connecting the calculated RGB adjustment values for the multiple target points that are determined to be within the boundary of unit cube 760A is called gray ramp 770 (FIG. 7B; actual gray tracking line). Gray ramp 770 represents the locus of calibrated points in LUT 250 that have been computed within first unit cube 760A. As shown in FIGS. 7B-7D, gray ramp 770 representing the true or actual gray levels "exits" from each unit cube 760 from any of the six side faces of unit cube 760.

On the other hand, when color calibration system 200 determines that the boundary of the current polyhedron (e.g., unit cube 760A) has been reached (branch YES at block 640) (because the most recent calculated target point does not belong to any of the six tetrahedrons of current unit cube 760 or because the most recent calculated RGB adjustment value is lower than (or outside) the RGB value at vertex 0 of the current unit cube), operation proceeds to block 645 where color calibration system 200 determines whether a boundary of cubic color output space 700 has been reached. In one embodiment, color calibration system 200 may make the determination at block 645 based on a comparison between the RGB value at vertex 0 of the current unit cube 760, and the RGB value at origin 710 of cubic color output space 700. Color calibration system 200 at block 640 may also determine that the boundary of unit cube 760A has been reached based on other conditions. For example, when the calculated RGB adjustment values for the current intermediate value deviate from corresponding RGB values before the correction by greater than a predetermined amount (i.e., more than a predetermined amount of correction being applied), color calibration system 200 may determine at block 640 that the "boundary" of unit cube 760A has been reached. In this case, even if the most recent calculated RGB adjustment values are within unit cube 760A, and gray ramp 770 has not "exited" from unit cube 760, color calibration system 200 may determine that the "boundary" of unit cube 760A has been reached, and operation proceeds to block 645.

When at block 645, color calibration system 200 determines that the boundary of cubic color output space 700 has not been reached, operation proceeds to block 610 where color calibration system 200 marks as vertex 7 of a new unit cube 760, the point in cubic color output space 700 corresponding to the most recent calculated RGB adjustment values in LUT 250. Color calibration system 200 then repeats processing for blocks 610-640 for the new unit cube 760.

More specifically, as shown in FIG. 7C, color calibration system 200 defines new polyhedron (e.g., unit cube 760B) whose vertex 7 is positioned at the most recent calculated RGB adjustment values for a target point that was determined by color calibration system 200 to be contained within one of the six tetrahedrons of the previous unit cube (e.g., unit cube 760A). That is, as shown in FIG. 7C, unit cubes 760A and 760B are concatenated by constructing new unit cube 760B at a last target point whose RGB adjustment values reached a boundary (e.g., one of the six faces) of unit cube 760A. Thus, new unit cube 760B is constructed at a point where gray ramp 770 of unit cube 760A intersects (and exits out of) one of the six faces of unit cube 760A. Alternately, unit cube 760B may be constructed at an interior point within unit cube 760A so that vertex 7 of unit cube 760B is positioned at the most recent calculated RGB adjustment values for a target point that corresponds to the interior point within unit cube 760A. Since RGB adjustment values (e.g., RGB triplet producing corresponding correct color) at vertex 7 of unit cube 760B are already calculated (and stored in LUT 250), at block 620, color calibration system 200 does not need to measure actual color response values at vertex 7 for new unit cube 760B. That is, at block 620, color calibration system 200 may only measure actual color response values for new defined vertices 0-6 of unit cube 760B.

Further, by constructing new unit cube 760B at the vertex of the last RGB adjustment values entered in LUT 250 (i.e., last point on gray ramp 770 within boundary defined by unit cube 760A), accurate calibration can be performed even for a panel having a very unbalanced or highly non-linear electro-optical transfer function. That is, even when no prior knowledge of the extent of non-linearity of the electro-optical transfer function of the display panel is available, by dynamically setting vertex 7 of new unit cube 760B on gray ramp 770 of unit cube 760A, and by defining size A of new unit cube 760B based on corrections applied for "gray" levels in unit cube 760A, color calibration system 200 may be able to perform color calibration with high accuracy. And since unit cube 760B may be set anywhere in cubic color output space 700 (depending on direction of gray ramp 770 exiting unit cube 760A), even extreme non-linearity of the electro-optical transfer function of display 240 can be corrected via the color calibration of color calibration system 200. It is to be understood that position of vertex 7 of new unit cube 760B may be on one of the faces of unit cube 760A and the position may vary from panel to panel depending on the particular characteristics of display 240 identified (e.g., native gray tracking response of display 240) during calibration based on measured vertices of previous unit cube 760A.

In the embodiment where the RGB triplet values of vertex 7 of new unit cube 760B as stored in LUT 250 are fractional values, color calibration system 200 may construct new unit cube 760B based on the fractional RGB adjustment values of vertex 7, in order to preserve the higher precision and accuracy provided by the fractional component. In this case, calibration system 200 may still define the remaining 7 vertices of new unit cube 760B as integer values based on size A set for current cube 760B at block 610, thereby constructing in a unit cube that is slightly skewed due to one of the vertices having a fractional component. Thus, unit cube 760 may not have parallel edges. Unit cube 760 may simply define a cuboid-like structure that can be decomposed in disjunct polyhedrons (e.g., six tetrahedrons) that collectively cover a space of unit cube 760 so that every point in the space belongs to one polyhedron. Color calibration system 200 may then identify one polyhedron that contains the target color that needs to be interpolated.

In one embodiment, based on the RGB adjustment values stored in LUT 250 corresponding to target points contained within previous unit cube 760A, color calibration system 200 may adjust size A at block 610 for next unit cube 760B. That is, the size A for unit cube 760B may be adjusted to be different from size A of unit cube 760A. For example, size A of unit cube 760B may be dynamically and adaptively made smaller (or larger) than that of unit cube 760A, depending on color calibration performed so far with respect to unit cube 760A.

In performing tetrahedral decomposition and interpolation based on vertices of a given unit cube 760, color calibration system 200 assumes that the response of the panel within the given unit cube 760 is linear. Thus, if there is excessive non-linearity in the native response curves of each color channel of the particular panel being calibrated, this assumption regarding linearity within each unit cube 760 may not hold true and may lead to poor calibration results if RGB adjustment values for target points within the unit cube are computed simply by interpolating (e.g., using linear equation) between points measured with a large interval (large size A). Accordingly, it may be desirable to reduce the size of the cube (i.e., increasing accuracy by lowering edge length A) and dynamically and adaptively take more measurements of actual color response values at smaller intervals, depending on panel characteristics. In one embodiment, color calibration system 200 may adjust size A at block 610 based on whether the RGB adjustment values of the previous unit cube 760 vary from corresponding uncorrected RGB values by more than a predetermined threshold amount. When large variations (e.g., higher than the threshold) are detected based on calibration data in LUT 250 for previous unit cube 760, color calibration system 200 may dynamically and adaptively adjust the size of next unit cube 760 to be smaller. Conversely, if the panel appears to be "good" based on the calibration performed thus far, color calibration system 200 may increase (or keep unchanged) the size of unit cube 760, in order to lower the number of measurement points, thereby increasing speed of the calibration, resulting in time and cost savings. In the case where unit cubes 760 are cuboids, each successive cuboid may be dynamically constructed to cover the region of cubic color output space 700 where the correction is leading (as indicated by gray ramp 770), depending on panel characteristics, and the desired RGB adjustment values. In this case, adjusting edge length A for next cuboid 760 may include dynamically adjusting lengths in one or more of the three dimensions of cuboid 760 (e.g., adjusting length, width, and/or height of cuboid 760 depending on analysis of RGB adjustment values of previous unit cube (or cuboid) 760).

In another embodiment, color calibration system 200 may adjust accuracy A at block 610 based on the region of cubic color output space 700 unit cube 760 is being defined in. For example, if it is determined that a user may not be able to discern a difference between gray levels in a particular range (e.g., regions close to black or close to white), color calibration system 200 may use larger unit cubes 760 in those regions. In yet another embodiment, based on an analysis of the RGB adjustment values of one unit cube 760, color calibration system 200 may decide to "skip" predetermined portions of cubic color output space 700, choosing to calculate the corresponding RGB adjustment values for "gray" levels in the "skipped" region (of gray ramp 770) via interpolation techniques instead. For example, when a certain number of RGB adjustment values successively calculated for target points by color calibration system 200 are determined to have a minimal amount of correction required (e.g., lower than a threshold), color calibration system 200 may decide to "skip" predetermined number of upcoming target points with successively lower luminance levels (e.g., based on analytical function of LUT 250). After jumping the predetermined number of gray levels, next unit cube 760 may be defined based on estimated RGB adjustment values of the skipped gray levels, and color response values may then be measured for vertices of the newly defined unit cube 760.

As explained above, processing performed at blocks 610-640 is thus repeated for each unit cube 760 in a dynamic, interactive, and adaptive manner. Since each new unit cube 760 (other than the first unit cube 760) is constructed in cubic color output space 700 so that the most recent calculated RGB adjustment value stored in LUT 250 becomes vertex 7 of the new unit cube 760, color calibration relative to selected point 755 is accurately performed because the actual or true gray ramp 770 (representing RGB adjustment values to produce correct colors of true "gray" levels represented by the intermediate values in the device-independent color space) always falls within a color space defined by a volume of one of unit cubes 760. That is, since a new unit cube 760 is created each time when a target point corresponding to a calculated intermediate value is not within one of the six tetrahedrons of a previous unit cube 760, the target point corresponding to each intermediate value is always within a (cubic) volume defined by one of unit cubes 760.

Said another way, since during the tetrahedral decomposition and interpolation, the RGB adjustment values for a target point are calculated only if weights of the four vertices of the corresponding (only) one of the six tetrahedrons are between 0 and 1, interpolation accuracy of the interpolated RGB adjustment values is increased because the tetrahedral interpolation is performed only if the target point is within the corresponding tetrahedron. And if the target point is not within any of the six tetrahedrons of previous unit cube 760, a new unit cube 760 is defined with dynamically adjusted calibration accuracy (size A), and color response values of vertices of the new unit cube are measured (except vertex 7, which is already known).

RGB adjustment values for the target point are then calculated based on the newly measured actual color response values for vertices of the new unit cube and more particularly, based on respective weights of color response values of the four vertices of the one of the six tetrahedrons of new unit cube 760 within which the target point is determined to be contained by the tetrahedral decomposition and interpolation of new unit cube 760. That is, after the six tetrahedrons of previous unit cube 760 are exploited, and the next target point is no longer within any of the six tetrahedrons, next unit cube 760 with six new tetrahedrons is constructed, and the same method continues until RGB adjustment values for the last location in LUT 250 are calculated. Further, with the color calibration method of color calibration system 200, only six tetrahedrons per unit cube may need to be processed for tetrahedral decomposition and interpolation. By contrast, conventional techniques may require up to eighteen tetrahedrons per unit cube to be processed.

As explained above, in FIG. 6, processing performed at blocks 610-640 is repeated for each unit cube 760 until RGB adjustment values for the last location of LUT 250 (e.g., row 0) are computed. When last unit cube 760 is defined, it may have a parallelepiped shape (e.g., cuboid) with dimensions less than that defined by corresponding size A (defined at block 610), due to the dimensions of cubic color output space 700. Irrespective of the shape and size of last unit cube 760, color calibration system 200 may perform tetrahedral decomposition and interpolation for one or more target points corresponding to respective intermediate values determined to be contained within last unit cube 760 in the same manner as for other unit cubes 760.

FIG. 7D illustrates an exemplary result of the color calibration performed by color calibration system 200 in accordance with the process described in flowchart 600 of FIG. 6. As shown in FIG. 7D, starting from selected point 755 relative to which the entire color calibration is aligned, color calibration system 200 may iteratively, dynamically, and adaptively define a plurality of unit cubes 760 based on progression of actual gray ramp 770 representing the locus of calibrated points in LUT 250 for producing the true or actual gray levels of selected point 755. Structure, relative positioning in space 700, and size of unit cubes 760 is dynamically determined during calibration operation without any apriori information about panel characteristics of display 240 being calibrated, or any information regarding a line representing the correction through cubic color output space 700. That is, no information regarding display 240 (other than that it supports RGB channels) prior to start of measurement is required by system 200.

Further, as shown in FIG. 7D, unit cubes 760 may not necessarily be connected vertex to vertex (e.g., vertex 0 and vertex 7 of two adjacent cubes are not connected). Based on the position where gray ramp 770 intersects and exits one unit cube 760, vertex 7 of next unit cube 760 may be positioned on any side face of the one unit cube 760. Still further, as shown in FIG. 7D, size A for first unit cube 760 closest to selected point 755 may be set at a default level (or another customized level), and based on the amount of correction required for the target points contained within current unit cube 760, color calibration system 200 may adjust size A for the next unit cube 760, so that sufficient number of measured actual color response values are available for calculating correction values for each "gray" level. Since the color calibration method requires each target point to be within (only) one tetrahedron within a unit cube 760, RGB adjustment values for each target point can be accurately calculated because the target point will never be in a region of cubic color output space 700 that is outside one of unit cubes 760, including a region that is between any two adjacent unit cubes 760.

Further, since unit cubes 760 are dynamically computed, the final number of unit cubes 760 may vary depending on native panel performance, target gamma, and selected point 755. The number of unit cubes 760 may vary between a minimum number of unit cubes 760 (resulting when the panel has low variation in the balance between the native response curves of each color channel of display 240) and a maximum number (resulting when the panel has a theoretically highest possible variation in the balance between the native response curves of each color channel of display 240). Thus, when N corresponds to the number of entries (or luminance levels) in the LUT, and A represents a size (edge length) of unit cube 760, in the best case scenario, the minimum number may be, $$n\_min = N/A,\qquad\text{Equation (2)}$$

and may result when unit cubes 760 are arranged perfectly along the diagonal of RGB cubic color output space 700.

In the worst case scenario, the maximum number of unit cubes 760 may be, $$n\_max = N/A + N/A + N/A = 3*N/A,\qquad\text{Equation (3)}$$

and may result when unit cubes 760 are sequentially arranged along each of red, green, and blue vectors of cubic color output space 700.

In one embodiment, color calibration system 200 may perform multiple color calibrations to generate multiple gray ramps 770 (FIG. 7D) for multiple selected points 755. For example, gray ramp 770 may be generated not only for one or more target white points or the native white point, but also for any selected point of a color (luminance and chromaticity) of interest, like a gray ramp 770 for skin tones, a gray ramp 770 for the color red, a gray ramp 770 for the color green, and the like. Calibrated display system 500 may then utilize one (or more) of the gray ramps 770 (stored as, e.g., LUTs 250) for generating corrected image data depending of current settings display 240.

Since distribution of unit cube 760 is dynamically and iteratively calculated based on structure of a previously computed unit cube 760, accuracy of the color calibration by color calibration system 200 may be maximized. As a result, no matter what the native gray tracking of display 240 panel is, unit cubes 760 defined by color calibration system 200 can dynamically and iteratively follow the target gray tracking (e.g., gray ramp 770) and target gamma without exceptions. Further, as shown in FIG. 7D, by arbitrarily varying the size of unit cube 760 from one unit cube to another based on identification of a region of space in cubic color output space 700 that needs higher accuracy for correction, color calibration system 200 can dynamically adjust accuracy of the color calibration. For example, nonlinearities of the electro-optical transfer function of display 240 may require a higher concentration of measurement points (interpolation points) in some regions of cubic color output space 700. In that case, the size of unit cube 760 can be decreased to allow more interpolation points to be used.

Additional advantages are also produced by the color calibration according to color calibration system 200. First, since color calibration system 200 does not assume any electro-optical transfer function of display panel 240 being calibrated, color calibration system 200 offers a color calibration method that has larger applicability and robustness relative to panel performance. Second, since color calibration system 200 does not assume that display 240 has certain gamma, color calibration system 200 can accept any custom target gamma function. That is, color calibration system 200 can accept not only gamma that can be approximated with a power law function, but also gamma that can be approximated with other types of functions like a perceptual quantizer (PQ) function, sRGB transfer function, linear function, curve, and the like. Third, construction of unit cube 760 may be such that a diagonal of unit cube 760 is along the gray tracking line or curve that was already computed. For example, along a tangent to the gray tracking curve in a last computed gray tracking point, the tangent being a diagonal of unit cube 760, the maximum dimension of unit cube 760 may be limited to edge length A, or can be determined from other constraints.

In addition to calibration in a factory, color calibration by color calibration system 200 may also be useful for external self-calibration by a customer when display 240 is aging and the factory calibration is no longer optimal. Color calibration system 200 may also allow a user to calibrate display 240 to behave according to a reference panel so that calibration of display 240 can match with that of other display panels of the user. For example, color calibration system 200 may take as input calibration data associated with the reference panel. The calibration data may be a LUT that shows for each gray level, the luminance value and chromaticity value defined in a device-independent color space. In one embodiment, in the external self-calibration mode, color calibration system 200 may load the calibration data of the reference panel as a target function when performing color calibration of display 240, and make the color calibration of display 240 exactly the same as that for the reference panel based on the loaded target function for each row of LUT 250. As a result, "gray" levels on display 240 will appear identical to "gray" levels on the reference panel for selected point 755.

Figure 8:
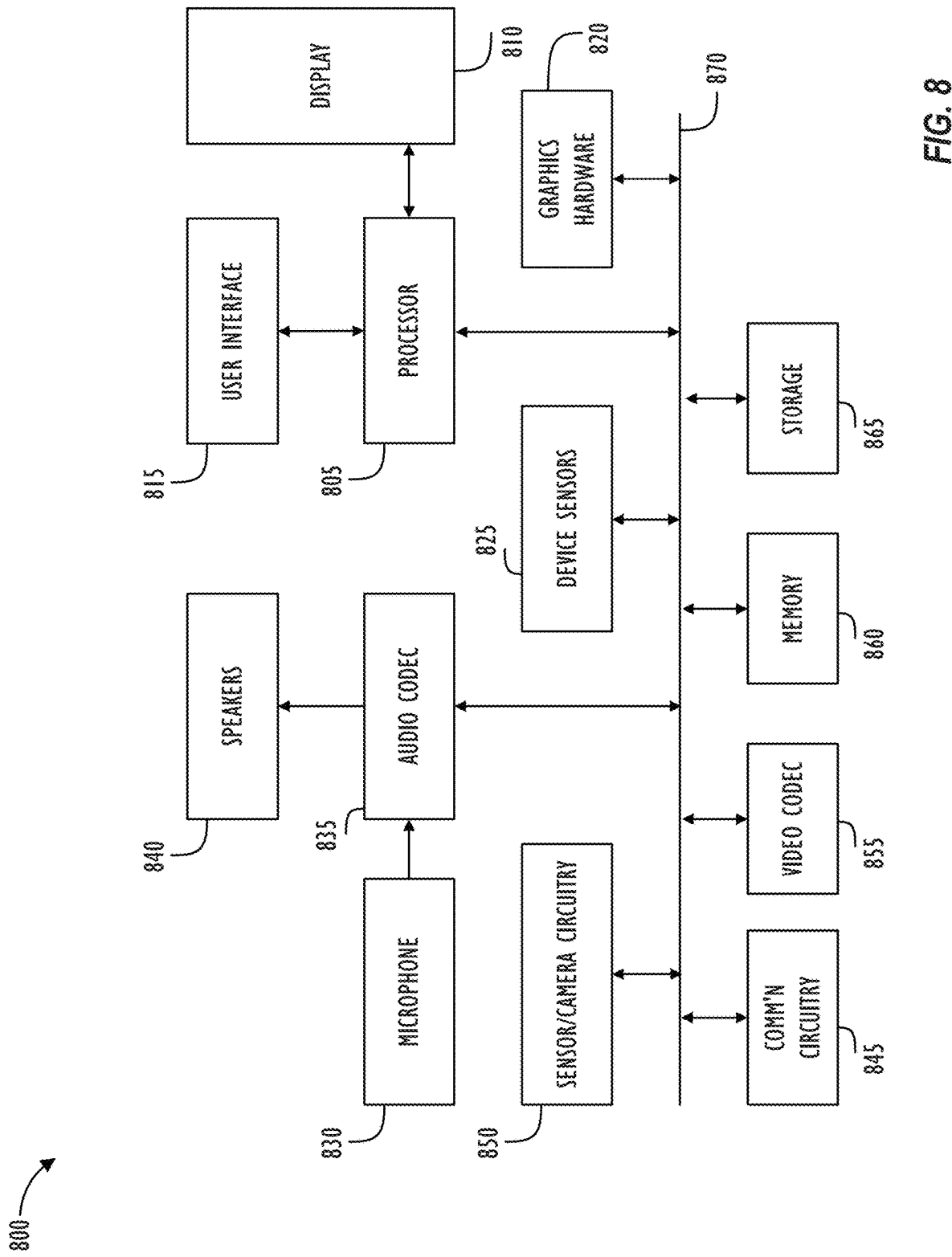
FIG. 8 is a simplified functional block diagram of an illustrative multi-functional electronic device, in accordance with one or more embodiments.

Referring to FIG. 8, a simplified functional block diagram of illustrative device 800 (e.g., computer system 210 of FIG. 2, computer system 520 of FIG. 5, and the like) that performs display color calibration as described in FIGS. 2-7 is shown. Device 800 may include processor 805, display 810 (e.g., display 240), user interface 815, graphics hardware 820, device sensors 825 (e.g., proximity sensor/ambient light sensor, accelerometer and/or gyroscope), microphone 830, audio codec(s) 835, speaker(s) 840, communications circuitry 845, sensor and camera circuitry 850, video codec(s) 855, memory 860, storage 865, and communications bus 870. Electronic device 800 may be, for example, a digital camera, a personal digital assistant (PDA), personal music player, mobile telephone, server, notebook, laptop, desktop, or tablet computer. More particularly, the disclosed techniques may be executed on a device that includes some or all of the components of device 800.

Processor 805 may execute instructions necessary to carry out or control the operation of many functions performed by a multi-functional electronic device 800 (e.g., such as display color calibration). Processor 805 may, for instance, drive display 810 and receive user input from user interface 815. User interface 815 can take a variety of forms, such as a button, keypad, dial, a click wheel, keyboard, display screen and/or a touch screen. Processor 805 may be a system-on-chip such as those found in mobile devices and include a dedicated graphics-processing unit (GPU). Processor 805 may represent multiple central processing units (CPUs) and may be based on reduced instruction-set computer (RISC) or complex instruction-set computer (CISC) architectures or any other suitable architecture and each may include one or more processing cores. Graphics hardware 820 may be special purpose computational hardware for processing graphics and/or assisting processor 805 process graphics information. In one embodiment, graphics hardware 820 may include one or more programmable graphics-processing unit (GPU), where each such unit has multiple cores.

Sensor and camera circuitry 850 may capture still and video images that may be processed to generate images in accordance with this disclosure. Sensor in sensor and camera circuitry 850 may capture raw image data as red, green, and blue (RGB) data that is processed to generate an image. Output from camera circuitry 850 may be processed, at least in part, by video codec(s) 855 and/or processor 805 and/or graphics hardware 820, and/or a dedicated image-processing unit incorporated within camera circuitry 850. Images so captured may be stored in memory 860 and/or storage 865. Memory 860 may include one or more different types of media used by processor 805, graphics hardware 820, and camera circuitry 850 to perform device functions. For example, memory 860 may include memory cache, read-only memory (ROM), and/or random access memory (RAM). Storage 865 may store media (e.g., audio, image and video files), computer program instructions or software, preference information, device profile information, and any other suitable data. Storage 865 may include one more non-transitory storage mediums including, for example, magnetic disks (fixed, floppy, and removable) and tape, optical media such as compact disc-ROMs (CD-ROMs) and digital video disks (DVDs), and semiconductor memory devices such as Electrically Programmable Read-Only Memory (EPROM), and Electrically Erasable Programmable Read-Only Memory (EEPROM). Memory 860 and storage 865 may be used to retain computer program instructions or code organized into one or more modules and written in any desired computer programming language. When executed by, for example, processor 805 such computer program code may implement one or more of the methods described herein.

Figure 9:
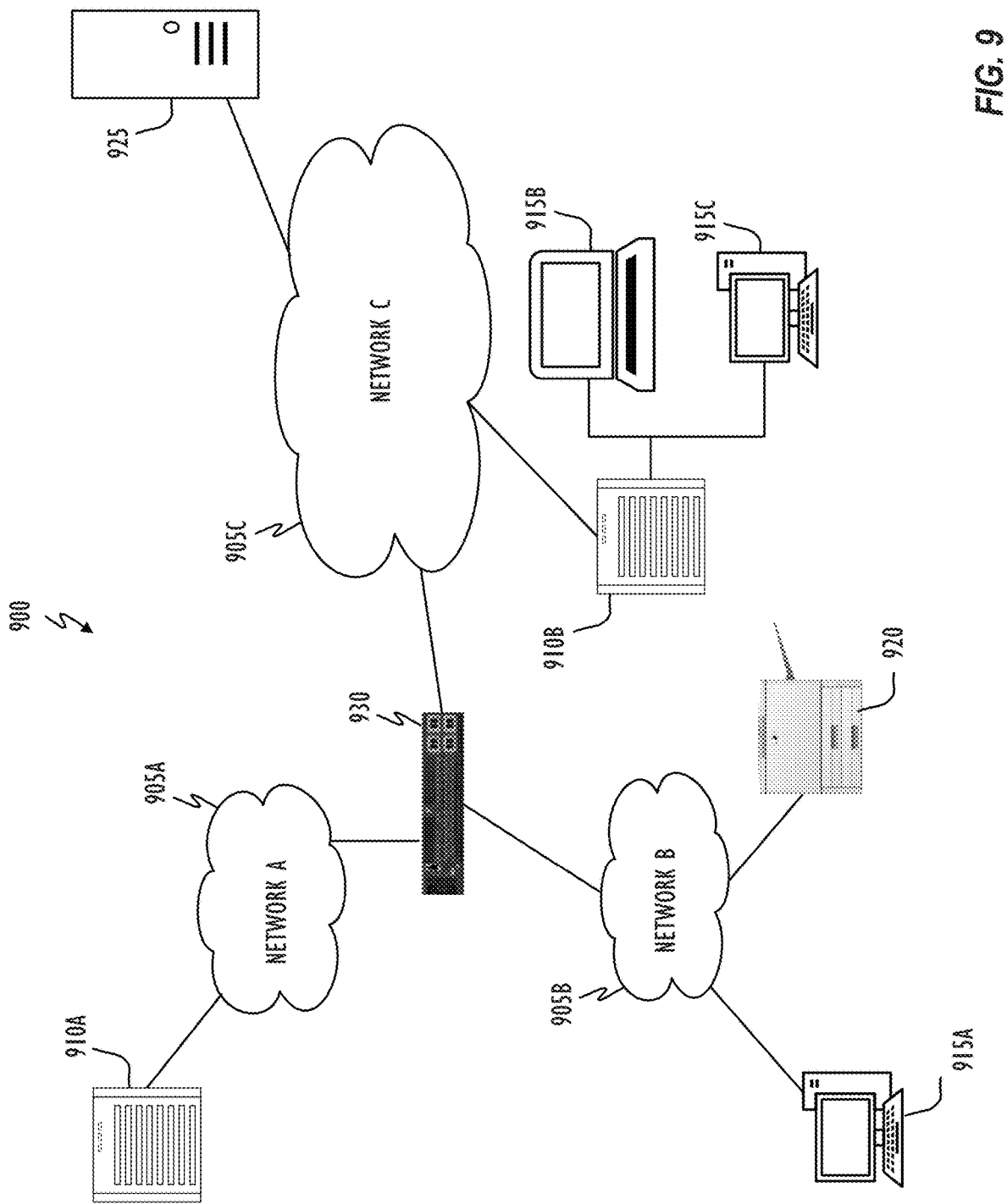
FIG. 9 shows, in block diagram form, a computer network, in accordance with one or more embodiments.

Referring to FIG. 9, illustrative network architecture 900 within which a system for performing display color calibration in accordance with the disclosed techniques may be implemented includes a plurality of networks 905, (e.g., 905A, 905B and 905C), each of which may take any form including, but not limited to, a local area network (LAN) or a wide area network (WAN) such as the Internet. Further, networks 905 may use any desired technology (wired, wireless or a combination thereof) and communication protocol (e.g., TCP, or transmission control protocol and PPP, or point to point). Coupled to networks 905 are data server computer systems 910 (e.g., 910A and 910B) that are capable of communicating over networks 905. Also coupled to networks 905, and/or data server computer systems 910, are client or end-user computer systems 915 (e.g., 915A, 915B and 915C). Each of these elements or components may be a computer system or electronic device as described above with respect to FIGS. 2, 5, and 8. In some embodiments, network architecture 900 may also include network printers such as printer 920 and network storage systems such as 925. To facilitate communication between different network devices (e.g., server computer systems 910, client computer systems 915, network printer 920 and storage system 925), at least one gateway or router 930 may be optionally coupled there between.

As used herein, the term "computer system" or "computing system" refers to a single electronic computing device or to two or more electronic devices working together to perform the function described as being performed on or by the computing system. This includes, by way of example, a single laptop, host computer system, wearable electronic device, and/or mobile device (e.g., smartphone, tablet, and/or other smart device).

It is to be understood that the above description is intended to be illustrative, and not restrictive. The material has been presented to enable any person skilled in the art to make and use the claimed subject matter as described herein, and is provided in the context of particular embodiments, variations of which will be readily apparent to those skilled in the art (e.g., some of the disclosed embodiments may be used in combination with each other). In addition, some of the described operations may have their individual steps performed in an order different from, or in conjunction with other steps, than presented herein. More generally, if there is hardware support some operations described in conjunction with FIGS. 2-7 may be performed in parallel.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations may be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). The use of the term "about" means±10% of the subsequent number, unless otherwise stated.

Many other embodiments will be apparent to those of skill in the art upon reviewing the above description. The scope of the invention therefore should be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A display color calibration method, comprising:
    measuring first color response values corresponding to a plurality of vertices of a first polyhedron defined within a color output space of a display device;
    calculating, for each of a first plurality of intermediate values determined based on the measured first color response values, red, green, and blue (RGB) adjustment values by decomposing the first polyhedron into a plurality of polyhedrons, identifying one of the plurality of polyhedrons that contains the intermediate value, and interpolating values of vertices of the identified polyhedron to calculate the RGB adjustment values for the intermediate value, wherein each calculated RGB adjustment value is within a boundary defined by the first polyhedron;
    defining, in response to determining that none of the plurality of polyhedrons of the first polyhedron contain a current intermediate value, a second polyhedron within the color output space, wherein a first vertex of a plurality of vertices of the second polyhedron corresponds to the calculated RGB adjustment values of a previous intermediate value that is one of the first plurality of intermediate values;

measuring second color response values corresponding to the plurality of vertices of the second polyhedron except the first vertex;

storing the RGB adjustment values within the boundary defined by the first polyhedron, and RGB adjustment values within a boundary defined by the second polyhedron into one or more look up tables; and using the RGB adjustment values stored into the one or more look up tables to color calibrate the display device.

2. The display color calibration method according to claim 1, further comprising:

adjusting an accuracy of the display color calibration method by dynamically and adaptively defining a size of the second polyhedron based on the calculated RGB adjustment values within the boundary defined by the first polyhedron, wherein the size defines an interval between the plurality of vertices of the second polyhedron.

3. The display color calibration method according to claim 2, further comprising:

calculating, for each of a second plurality of intermediate values determined based on the measured first color response values, RGB adjustment values by decomposing the second polyhedron into a plurality of polyhedrons, identifying one of the plurality of polyhedrons that contains the intermediate value, and interpolating values of vertices of the identified polyhedron to calculate the RGB adjustment values for the intermediate value, wherein each calculated RGB adjustment value is within the boundary defined by the second polyhedron.

4. The display color calibration method according to claim 3, wherein the size of the first polyhedron is different from the size of the second polyhedron.

5. The display color calibration method according to claim 1, wherein each of the first and second polyhedrons is a cube defined in the color output space of the display device.

6. The display color calibration method according to claim 1, wherein decomposing the first polyhedron into a plurality of polyhedrons comprises diagonally decomposing the first polyhedron into six diagonal tetrahedrons.

7. The display color calibration method according to claim 1, wherein a first one of the plurality of vertices of the first polyhedron corresponds to a calibrated target white point of the display device whose color response values are known, and wherein the first color response values are measured corresponding to the plurality of vertices of the first polyhedron except the first vertex.

8. The display color calibration method according to claim 7, wherein each of the first plurality of intermediate values, the measured first and second color response values, and the target white point of the display device are defined in a device-independent color space, and wherein the first plurality of intermediate values are determined based on the target white point of the display device.

9. The display color calibration method according to claim 8, wherein each of the first plurality of intermediate values is determined by sequentially decrementing a luminance value of the target white point by a predetermined fraction while keeping a chromaticity value of the target white point to be the same to sequentially derive a target point in the device-independent color space, wherein the RGB adjustment values are calculated for the target point.

10. The display color calibration method according to claim 8, wherein each of the first plurality of intermediate values is determined by sequentially decrementing a luminance value of the target white point by a predetermined fraction and sequentially changing from a chromaticity value of the target white point to a chromaticity value based on a predetermined condition to sequentially derive a target point in the device-independent color space, wherein the RGB adjustment values are calculated for the target point.

11. The display color calibration method according to claim 1, wherein a first one of the plurality of vertices of the first polyhedron corresponds to a calibrated selected point of a color of interest in the color output space of the display device, wherein color response values of the selected point are known, and wherein the first color response values are measured corresponding to the plurality of vertices of the first polyhedron except the first vertex.

12. A display color calibration system, comprising:
a display device;
a measuring unit;
memory; and
one or more processors operatively coupled to the display device, the measuring unit, and the memory, wherein the memory comprises instructions that, when executed by the one or more processors, cause the one or more processors to:

measure, with the measuring unit, first color response values corresponding to a plurality of vertices of a first unit cuboid defined within a cubic color output space of the display device;

calculate, for each of a first plurality of intermediate values determined based on the measured first color response values, RGB adjustment values by decomposing the first unit cuboid into a plurality of tetrahedrons, identifying one of the plurality of tetrahedrons that contains the intermediate value, and interpolating values of vertices of the identified tetrahedron to calculate the RGB adjustment values for the intermediate value, wherein each calculated RGB adjustment value is within a boundary defined by the first unit cuboid;

define, in response to determining that none of the plurality of tetrahedrons of the first unit cuboid contain a current intermediate value, a second unit cuboid within the cubic color output space, wherein a first vertex of a plurality of vertices of the second unit cuboid corresponds to the calculated RGB adjustment values of a previous intermediate value that is one of the first plurality of intermediate values;

measure, with the measuring unit, second color response values corresponding to the plurality of vertices of the second unit cuboid except the first vertex;

store the RGB adjustment values within the boundary defined by the first unit cuboid, and RGB adjustment values within a boundary defined by the second unit into one or more look up tables; and use the RGB adjustment values stored into the one or more look up tables to color calibrate the display device.

13. The display color calibration system according to claim 12, wherein the memory further comprises instructions that, when executed by the one or more processors, cause the one or more processors to:

adjust an accuracy of the display color calibration system by dynamically and adaptively defining a size of the second unit cuboid based on the calculated RGB adjustment values within the boundary defined by the first unit cuboid, wherein the size defines an interval between the plurality of vertices of the second unit cuboid.

14. The display color calibration system according to claim 13, wherein the memory further comprises instructions that, when executed by the one or more processors, cause the one or more processors to:

calculate, for each of a second plurality of intermediate values determined based on the measured first color response values, RGB adjustment values by decomposing the second unit cuboid into a plurality of tetrahedrons, identifying one of the plurality of tetrahedrons that contains the intermediate value, and interpolating values of vertices of the identified tetrahedron to calculate the RGB adjustment values for the intermediate value, wherein each calculated RGB adjustment value is within a boundary defined by the second unit cuboid.

15. The display color calibration system according to claim 14, wherein the size of the first unit cuboid is different from the size of the second unit cuboid.

16. The display color calibration system according to claim 12, wherein the instructions that, when executed by the one or more processors, cause the one or more processors to decompose the first unit cuboid into a plurality of tetrahedrons comprise instructions that, when executed by the one or more processors, cause the one or more processors to decompose diagonally the first unit cuboid into six diagonal tetrahedrons.

17. The display color calibration system according to claim 12, wherein a first one of the plurality of vertices of the first unit cuboid corresponds to a calibrated target white point of the display device whose color response values are known, and wherein the first color response values are measured corresponding to the plurality of vertices of the first unit cuboid except the first vertex.

18. The display color calibration system according to claim 12, wherein the second unit cuboid is defined within the cubic color output space such that the first vertex of the plurality of vertices of the second unit cuboid is positioned at an interior point within the first unit cuboid.

19. A non-transitory program storage device, readable by one or more programmable control devices and comprising instructions stored thereon to cause the one or more programmable control devices to:

measure first color response values corresponding to a plurality of vertices of a first polyhedron defined within a color output space of a display device;

calculate, for each of a first plurality of intermediate values determined based on the measured first color response values, red, green, and blue (RGB) adjustment values by decomposing the first polyhedron into a plurality of polyhedrons, identifying one of the plurality of polyhedrons that contains the intermediate value, and interpolating values of vertices of the identified polyhedron to calculate the RGB adjustment values for the intermediate value, wherein each calculated RGB adjustment value is within a boundary defined by the first polyhedron;

define, in response to determining that none of the plurality of polyhedrons of the first polyhedron contain a current intermediate value, a second polyhedron within the color output space, wherein a first vertex of a plurality of vertices of the second polyhedron corresponds to the calculated RGB adjustment values of a previous intermediate value that is one of the first plurality of intermediate values;

measure second color response values corresponding to the plurality of vertices of the second polyhedron except the first vertex; and store the RGB adjustment values within the first polyhedron, and RGB adjustment values within the second polyhedron into one or more look up tables.

20. The non-transitory program storage device of claim 19, wherein the instructions further cause the one or more programmable control devices to:

adjust an accuracy of display color calibration by dynamically and adaptively defining a size of the second polyhedron based on the calculated RGB adjustment values within the boundary defined by the first polyhedron, wherein the size defines an interval between the plurality of vertices of the second polyhedron; and calculate, for each of a second plurality of intermediate values determined based on the measured first color response values, RGB adjustment values by decomposing the second polyhedron into a plurality of polyhedrons, identifying one of the plurality of polyhedrons that contains the intermediate value, and interpolating values of vertices of the identified polyhedron to calculate the RGB adjustment values for the intermediate value, wherein each calculated RGB adjustment value is within a boundary defined by the second polyhedron.

* * * * *